US009509939B2

(12) United States Patent
Henion et al.

(10) Patent No.: US 9,509,939 B2
(45) Date of Patent: Nov. 29, 2016

(54) DISPLAY FOR IMMERSIVE WINDOW EFFECT

(71) Applicant: Universal City Studios LLC, Universal City, CA (US)

(72) Inventors: David Henion, Orlando, FL (US);
Matthew Gall, Orlando, FL (US);
Brian B. McQuillian, Orlando, FL (US); Alex Smith, Orlando, FL (US);
Justin M. Schwartz, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 87 days.

(21) Appl. No.: 14/295,774

(22) Filed: Jun. 4, 2014

(65) Prior Publication Data
US 2015/0358574 A1    Dec. 10, 2015

(51) Int. Cl.
| H04N 5/74 | (2006.01) |
| G03B 21/606 | (2014.01) |
| G03B 21/62 | (2014.01) |
| G03B 21/14 | (2006.01) |
| A63G 31/00 | (2006.01) |
| G03B 21/56 | (2006.01) |

(52) U.S. Cl.
CPC ............ H04N 5/7458 (2013.01); A63G 31/00 (2013.01); G03B 21/56 (2013.01); G03B 21/606 (2013.01); G03B 21/62 (2013.01); H04N 5/7475 (2013.01)

(58) Field of Classification Search
CPC ............. H04N 5/7458; H04N 5/7475; G03B 21/606; G03B 21/62; G03B 21/147
See application file for complete search history.

(56) References Cited

U.S. PATENT DOCUMENTS

| 3,757,040 A | 9/1973 | Bennett et al. |
| 5,319,744 A | 6/1994 | Kelly et al. |
| 2003/0011535 A1 | 1/2003 | Kikuchi et al. |
| 2006/0238815 A1 | 10/2006 | Polus |
| 2007/0103776 A1* | 5/2007 | Cok ........................ G03B 21/56 359/451 |
| 2007/0171380 A1* | 7/2007 | Wright .................... G03B 21/14 353/69 |
| 2007/0296920 A1* | 12/2007 | Mezouari ........... H04N 13/0404 353/7 |
| 2008/0278826 A1 | 11/2008 | Wakamiya |
| 2010/0128351 A1* | 5/2010 | Epstein .................... G02B 5/02 359/613 |
| 2010/0299630 A1* | 11/2010 | McCutchen ............. H04N 7/18 715/803 |
| 2011/0136581 A1 | 6/2011 | Cortelyou et al. |

(Continued)

FOREIGN PATENT DOCUMENTS

| JP | 59164518 | 9/1984 |
| JP | 2008141643 | 6/2008 |

OTHER PUBLICATIONS

AP Reporter et al. Mail Online. All aboard the Hogwart's Express! Harry Potter theme park recreates train ride through English countryside . . . all without leaving the U.S. Mar. 16, 2014.

(Continued)

Primary Examiner — Brian Yenke
Assistant Examiner — Sean Haiem
(74) Attorney, Agent, or Firm — Fletcher Yoder, P.C.

(57) ABSTRACT

A system utilizes a screen having a compound curvature to simulate an environment viewable from multiple vantage points. The compound curvature of the screen is such that the screen is curved in at least two directions about at least two axes. The display can be positioned behind a wall opening to provide a window effect. The display terminates its active image area outside of a region from which the display can be viewed to create a seemingly infinite simulated environment.

19 Claims, 13 Drawing Sheets

(56) References Cited

U.S. PATENT DOCUMENTS

2012/0320343 A1    12/2012  Papaefstathiou et al.
2013/0032053 A1*   2/2013   Stoker ................... A63G 31/16
                                                         104/69
2013/0094002 A1*   4/2013   Chung ................. G03B 21/147
                                                         353/69
2013/0308183 A1*   11/2013  Vermeirsch ............ G03B 21/62
                                                         359/451

OTHER PUBLICATIONS

PCT International Search Report and Written Opinion dated Sep. 30, 2015.

* cited by examiner

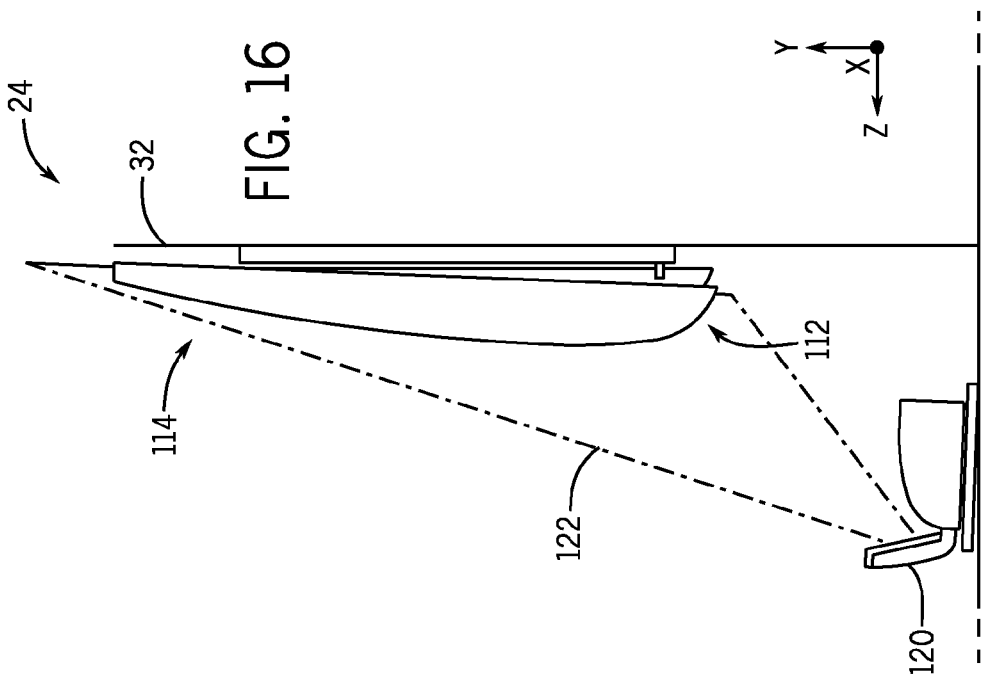
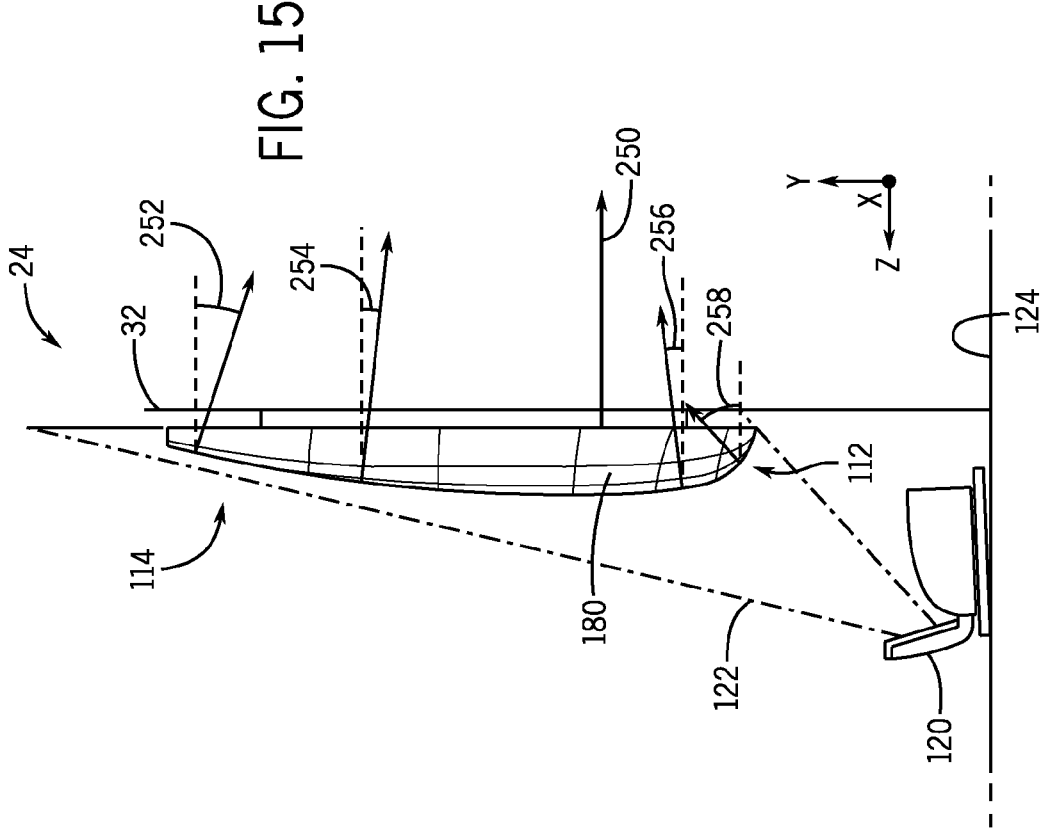

DISPLAY FOR IMMERSIVE WINDOW EFFECT

BACKGROUND

The present disclosure relates generally to a system and method for creating an immersive simulated environment, more particularly, to a system and method for displaying multiple perspectives of a simulated environment to an observer using a single display.

Theme or amusement park ride attractions have become increasingly popular. Amusement rides generally include rides with ride vehicles travelling along a path (e.g., a railway or a track), rides that are fixed relative to the ground, or a combination thereof. In moving rides, the travelling path may be situated in different surroundings (e.g., on a mountain top, in a tunnel, under the water, etc.). Along the path, there may be different type of show events, such as moving action figures, video screen projections, sound effects, water effects, etc. In fixed rides, a movable passenger platform having multiple degrees of freedom is typically situated on a relatively still base. The passenger platform can move in several different directions including angular movements, such as roll, pitch and yaw, and linear movements, such as heave and surge. The passenger platform is also frequently positioned adjacent one or more projection screens showing a series of images or a motion picture. For added realism and effect, the movement of the passenger platform can be synchronized with the projected images or motion picture.

When the show events include visual effects, these effects may be provided using one or a combination of features such as screen projections and/or real environments that may be custom-designed for the particular theme associated with the ride attraction. As an example, a two-dimensional screen may be provided at a forward section of a passenger platform. The screen may display a changing landscape or other environment (e.g., an underwater area, space, through mountains) along which the passenger platform simulates travel.

In another example, a moving passenger platform (i.e., a ride vehicle) may travel along a pathway (e.g., a rail) including custom-designed surroundings associated with the ride. The passenger platform may pass through a tunnel having props, such as motorized animals or creatures (e.g., dinosaurs), robots, other vehicles, and so forth. These props can be combined with other effects, such as fires, explosions, and the like, to enhance the realism or immersive nature of the ride. Further, some surroundings may be real environments, such as an aquarium with aquatic life, a small jungle-like environment with foliage and animals, or similar environments.

While these simulated environments can be very effective at creating a pleasurable experience for the rider, there are difficulties associated with their operation. For example, motorized equipment can require regular maintenance to ensure appropriate operation. Real environments require proper care to ensure the safety and health of the life associated with the environment. In addition, display-based environments that utilize two-dimensional screens are not as immersive as environments that are custom-designed for the particular attractions. Accordingly, these attractions may be subject to further improvement, for example to reduce maintenance, improve the realism of display-based technologies, and so forth.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one aspect of the present disclosure, a system includes a display having a surface with a compound curvature relative to a first plane defined by the overall height and width of the display. The surface includes a projection side onto which image-based media can be projected and a viewing side configured to display the projected image-based media to an observer. The compound curvature enables the viewing side to display the projected image-based media in a manner that simulates different portions of an environment presented from multiple directions.

In accordance with another aspect of the present disclosure, a method includes projecting image-based media onto a display with a projector. The display is attached to a first side of a wall opposite a second side of the wall from which the display is viewable by an observer, and the display is positioned over an opening in the wall. The method further includes display mapping the projected image-based media using a compound curvature of a surface of the display to produce a substantially undistorted simulation of an environment, the simulated environment having an appearance of being behind the surface of the display such that the display acts as a window through the wall and into the simulated environment. The method also includes enabling the observer to view the simulated environment from multiple perspectives, each perspective providing a different view of the simulated environment, using the compound curvature of the surface and by terminating view directions of the display beyond the extents of the opening in the wall.

In accordance with another aspect of the present disclosure, a system includes a viewing region bounded at least partially by a wall having an opening, and a display screen mounted on the wall and positioned over the opening. The display screen includes edges that extend beyond the opening and curvatures that curve the display screen toward and away from the wall in at least two directions and about at least two axes. The edges and the curvatures terminate a viewing cone of the display screen outside of the viewing region. The viewing cone of the display screen represents all view directions from which media displayed by the display screen can be observed.

DRAWINGS

These and other features, aspects, and advantages of the present disclosure will become better understood when the following detailed description is read with reference to the accompanying drawings in which like characters represent like parts throughout the drawings, wherein:

FIGS. 15 and 16 illustrate examples of the manner in which the projector and display of the projection system of FIG. 1 may be moved relative to the opening;

DETAILED DESCRIPTION

Figure 1:
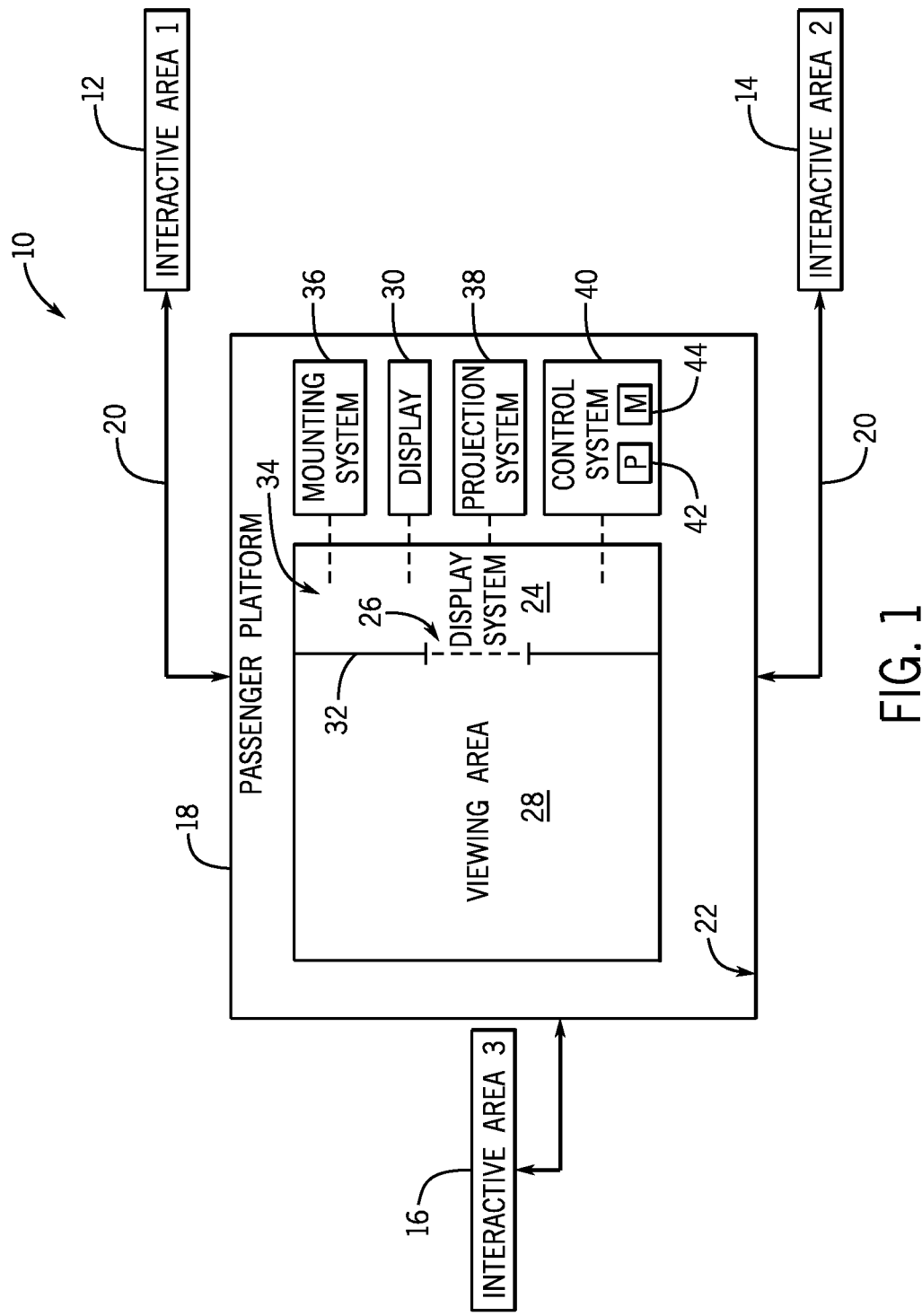
FIG. 1 illustrates an embodiment of a simulated world including a passenger platform that simulates transport between interactive areas and includes an immersive window display system, in accordance with the present disclosure.

In traditional two-dimensional displays used in ride attractions, an observer looking at a scene provided by the display may believe that the scene is real (i.e., immersive), as long as the observer is within an appropriate viewing angle and distance of the display. However, as the observer moves closer to the display, or outside of a viewing angle of the display but can still see the display, the display may fail to maintain its intended effect. Indeed, in typical display-based ride attractions, the passenger platform includes seating for the passengers. The seating maintains the passengers in a proper relationship with the display, thereby maintaining the realism of the display. However, such attractions do not enable the passengers to move about the platform. In addition, the displays are often limited to being at a forward or rearward section of the platform at a relatively large distance away from the passengers. It is now recognized that these limitations may be undesirable, for example in an area of an amusement park dedicated to a particular theme, such as a "world" simulation. In such a simulation, guests are able to freely move about the area, interact with objects, and view effects all relating to the theme in some way. The combination of these types of interactions and simulations enhances the guest's feeling of being a part of the simulated world. Indeed, restricting movement within such an area of an amusement park may be generally undesirable.

In accordance with the present disclosure, a display system is provided that enables guests to move about an area, such as a passenger platform (e.g., a ride vehicle), and view a display from multiple perspectives without losing the intended effect of the display. For example, a guest might walk up to the display, arranged as a window would be in the real world, and look straight at the display to see a view of a simulated environment, such as a landscape. This would create the effect of a window through which the landscape is viewed. Normally, in a typical display, the effect would be limited to the single displayed landscape. However, using the displays of the present disclosure, the guest might, for instance, look down at the display and be able to see a different section of the landscape (e.g., the ground outside of the simulated window, tracks under a railcar, the ground viewed from a high altitude in a simulated airplane, a planet viewed from space).

The displays of the present disclosure additionally or alternatively enable the guest to look to the right and to the left, and thereby view additional, different sections of the landscape. For example, if the guest is in an attraction where the display is a window in a train car, the guest might look to the left to see a view of the landscape that is oncoming (e.g., a forward portion of a path and a forward section of the train and tracks), while if looking to the right, the guest might see a view of the landscape that has just passed, along with a rearward section of the train and tracks. Indeed, the simulated landscape may also move horizontally, vertically, or in any direction relative to the observing guest to simulate a changing landscape associated with a real or simulated movement of a passenger platform.

The display system is able to accomplish such simulations through the use of, among other things, a specially-designed screen having a unique shape and arrangement relative to a series of potential vantage points of an observer. For example, the display (e.g., a screen such as a projection screen, a light emitting diode (LED) display, a liquid crystal display (LCD), plasma-based display, electronic ink display, or any other suitable display technology) may have a surface with a complex/compound curvature. The compound curvature is generally a combination of at least two curvatures in relation to a plane defined by the overall height and width of the display, and can also be considered to have the compound curvature relative to a flat wall to which the display might be mounted (though walls that are not flat can also be used with the displays of the present disclosure).

As may be appreciated, certain curvatures may extend the entirety of a surface (e.g., top to bottom) in a symmetrical manner, or a surface may have only certain portions where a curvature is present. Because the curvatures present in the displays of the present disclosure may be numerous, and, in certain embodiments, may extend into other curvatures, to facilitate discussion, the curvatures described herein may be considered to extend from an edge of the display (e.g., a bottom or top edge) and to the midpoint of the surface of the display, or vice-versa. Similarly, the curvatures may be considered to transition from a curvature and into a flat portion. Where such a transition is present, the transition of the curvature of the surface and into the flat portion is considered to denote the terminus of the curvature. Where such a transition is not present, the curvatures may be considered to terminate proximate the middle point of the surface of the display.

In an embodiment, at least one of the curvatures of the screen is not symmetrical about a vector normal to the highest point of the curvature. This will be further appreciated with reference to the figures described below. Generally, the asymmetric curvature can be considered to result in a "bulge" closer to one edge of the screen compared to another, parallel edge of the screen. The curvatures that result in these bulges may be considered principal curvatures. When combined, the principal curvatures create the shape of the screen.

This type of curvature results in a plurality of potential viewing cones of the screen or, stated differently, a screen that is viewable from different vantage points to view different regions of a common simulated environment. For example, if one principal curvature of the screen is toward the bottom of the screen, and away from an observer, the observer is able to look down at the screen and see a region of the landscape that is situated below the observer. Conversely, if the observer looks straight at the display, the observer sees a view of the landscape that is generally at the same height as the observer. The same may be true for principal curvatures at the top, left, and right portions of the screen, where an observer would see portions of the landscape that are situated above, to the left, and to the right, respectively, relative to the observer.

The displays of the present disclosure, in certain embodiments, may be used in combination with a projector (e.g., when the display is a projection screen). In such embodiments, the projector may be positioned in a specific orientation relative to the display to enable the media that the projector projects to be appropriately displayed on various sections of the screen. For instance, the projector might project media that is pre-distorted, e.g., is distorted relative to the actual simulated environment that the media is attempting to represent. The projector may be positioned relative to the screen so that the screen stretches or compresses appropriate pixels of the projected, pre-distorted media. The screen thereby displays a substantially undistorted representation of a landscape or other environment.

As noted above, the present approaches to providing an immersive window effect for an observer may be used in settings such as an amusement park, for instance on an amusement ride. However, the present approaches may be applied to any display where multiple vantage points may be desirable, such as training simulators (e.g., flight simulators, game simulators), or in home, office, or retail environments. To facilitate discussion, the present embodiments are disclosed in the context of an amusement park ride, where a display system is incorporated into the ride vehicle to enhance a passenger's experience. FIG. 1 depicts an embodiment of a simulated world 10 within an amusement park, which may include such a ride.

In the depicted embodiment, the simulated world 10 includes first, second, and third interactive areas 12, 14, 16, in which guests of the amusement park may interact with different props, characters of the simulated world 10, and the like. Props may include different buildings, stores, machines, devices, and so on, and the characters may be actors, may be simulated on a display, or both. For example, one of the interactive areas may be a first section of an amusement park dedicated to a particular theme, while the other interactive areas may be different sections of the same or a different amusement park dedicated to the theme.

For instance, the first interactive area 12 may be a first city, world, and/or time period, the second interactive area 14 may be a second city, world, and/or time period, and the third interactive area 16 may be a third city, world, and/or time period. Thus, the simulated world 10 may be representative of any collection of different times, regions, and the like. The term "simulated world," as used herein, is therefore not intended to be particularly limiting. Rather, it is intended to encompass the immersion of the guest into an environment imitating a real or fictitious setting.

A passenger platform 18 may serve as a real or simulated transport (e.g., a ride vehicle) that actually transports, or simulates transport, between the different interactive areas. The passenger platform 18 may travel along paths, for example a first path 20 between the first and second interactive areas 12, 14. Additionally or alternatively, the passenger platform 18 may simulate travel, and may have different areas where guests enter and exit the platform 18. In the illustrated embodiment, for example, the passenger platform 18 may simulate transport to the third interactive area 16 without actually transporting guests between points. The passenger platform 18 may include an exterior 22 that is designed to resemble certain modes of transportation, such as a car, a train, a submarine, a boat, a spaceship, an airplane, or the like, depending on the intended effect of the simulated world 10.

As an illustrative example, the interactive areas may be different time periods, where the first interactive area 12 is, for instance, a city in ancient Greece, the second interactive area 14 is, for example, a city in the present time, and the third interactive area 16 is, for example, a city in a future time. In this example, the passenger platform 18 may be a simulated time machine. In such embodiments, the passenger platform 18 does not actually travel, but simulates travel using physical, auditory, and visual effects.

In another example, the interactive areas may be different cities or other locations in a real or fictitious world, such as a themed world recreated from popular books, movies, television shows, or the like. The passenger platform 18 may seemingly transport guests between the cities using real paths (e.g., tracks) along which the passenger platform 18 travels. This travel may be further augmented by real or simulated surroundings.

In the illustrative embodiments above, the passenger platform 18 is intended to provide an immersive experience for the passengers. As a part of this experience, the passenger platform 18 includes a display system 24, which is generally configured to simulate an environment external to the platform 18 that the passengers can view through an opening 26—corresponding to a desired window effect. Referring to the examples above, if the passenger platform 18 simulates time travel, the display system 24 might provide a dynamic (changing) view of travel through a wormhole, or other similar spectacle, through the opening 26. If the passenger platform 18 simulates travel between real or fictitious points, the display system 24 might provide a dynamic view of landscapes (e.g., mountains, oceans, bridges, space) through the opening 26.

In contrast to a normal display system, the display system 24 of the present disclosure is configured to provide these dynamic views from multiple perspectives (e.g., vantage points) within a viewing area 28 of the platform 18. For example, a passenger on the platform 18 may sit on a chair within the viewing area 28, or even walk over to the opening 26, to view the simulated environment. Normally, if a passenger were to do this, the passenger would quickly realize that the window effect is merely a screen showing an image in two dimensions. Three-dimensional simulations using a two-dimensional screen may not be able to overcome this limitation, since they are also limited to a single perspective. In addition, such simulations can also require the use of specialized glasses, or may have a limited range of effect.

To enhance the realism of the simulated environment, the display system 24 includes a display 30 that produces the window effect when used in combination with the opening 26. The display 30 terminates its viewing cone (e.g., the collection of different possible directions from which the display 30 can be viewed) outside of a region from which passengers can look through the opening 26. In other words, the passenger's ability to see the display 30 is limited by the space of the viewing area 28, not the configuration of the display 30. As an example, a passenger sitting adjacent to and offset from the opening 26 may see a portion of the display 30 that curves such that the passenger's sight line is still at a perpendicular or oblique angle below 90 degrees (e.g., between 90 and 20 degrees) relative to the display 30. Such embodiments are described in further detail below.

The display 30, in general, attaches to a wall 32 or similar prop that separates the viewing area 28 from a projection area 34 in which some or all of the display system 24 is positioned. The display 30 may be directly attached to the wall 32 in a movable or immovable attachment, and may be secured using any appropriate technique including the use of fasteners, adhesives, and the like. A mounting system 36 may alternatively be used to mount the display 30 to the wall 32. As an example, the mounting system 36 may include an A-frame support for the display 30.

The display 30 may, in certain embodiments, be a projection screen that receives projected media from a projection system 38. In such embodiments, the projection system 38 will generally include a projector (e.g., one or more projectors) that projects image-based media onto one side of the display 30 (e.g., a projection side), which may be the same side or an opposite side of the display 30 that is visible from the viewing area 28 (e.g., a viewing or display side). The projection system 38, for instance the projector, may also be mounted to the passenger platform 18 on a floor, ceiling, or other structure. Indeed, the mounting system 36 may mount both the display 30 and the projection system 38 to the passenger platform 18 together, thus reducing movement of the display 30 and projector relative to one another. In still further embodiments, a tray system may be a part of the mounting system 36 to enable access to the projection system 38 from within the viewing area 28 (e.g., for servicing and maintenance).

The operation of the display system 24 is generally coordinated with the movement (e.g., simulated or real) of the passenger platform 18 using a control system 40. The control system 40 may be a local control system (e.g., standalone), or may be a control system that is networked as part of a larger control system that controls the operation of the passenger platform 18, or even the entire simulated world 10. The control system 40 may include processing devices (control circuitry), such as a processor 42 and a memory 44, which is a non-transitory, machine-readable medium. The control system 40 may also include other features such as networking devices, cabling, and so forth, to enable communication between the control system 40 and other components of the display system 24 and the passenger platform 18. The memory 44 may store data representative of the image-based media to be displayed on the display 30, and may be accessed (e.g., directly, or indirectly through the processor 42) by the projection system 38 and/or the display 30 during use.

Though the display system 24 may be used as a standalone system, the display system 24 may also be controlled by the control system 40 in accordance with additional technologies that enable enhanced simulations. For example, the control system 40 may be in communication with various additional sensors, such as near-field communication devices, or any other wireless communication features capable of detecting an identity of a guest and providing appropriate visual simulations as a result. For instance, if the control system 40 receives feedback indicative of a child, the control system 40 may ensure that suitable media is displayed.

Further, the control system 40 and/or any other control circuitry associated with the projection system 38 may store appropriate executable instructions and media (e.g., data that is reproduced as one or more images by the projection system 38) to generate three-dimensional effects using active or passive three-dimensional technologies. As an example, the control circuitry (e.g., control system 40) may be configured to cause the projection system 38 to project alternating pairs of images to generate a three-dimensional effect for the image when viewed using active three-dimensional glasses (e.g., glasses with shutters on each lens that are alternating opened and closed for the wearer's eyes). As another example, the control circuitry may be configured to cause the projection system 38 to project simultaneous pairs of images to generate a three-dimensional effect for the image when viewed using passive three-dimensional glasses (e.g., polarized glasses). In general, any suitable 3D display technologies may be utilized.

As another example, the control system 40 may control or operate in conjunction with head tracking or device tracking technologies that enable motion detection, gestures, and so forth. As a result of such detection, the control system 40 may adjust the displayed media to enhance the immersive qualities of the experience. For instance, the display 30 may normally simulate a friendly passerby while the passenger platform 18 is in motion. If the guest waves their hand, the motion detection system may detect this movement, and cause the simulated passerby to wave back. Therefore, in a general sense, the control system 40 in combination with such technologies may enable the display 30 to be interactive. However, in some embodiments, the display 30 and the control system 40 may not be interactive with the passengers/guests.

Figure 2:
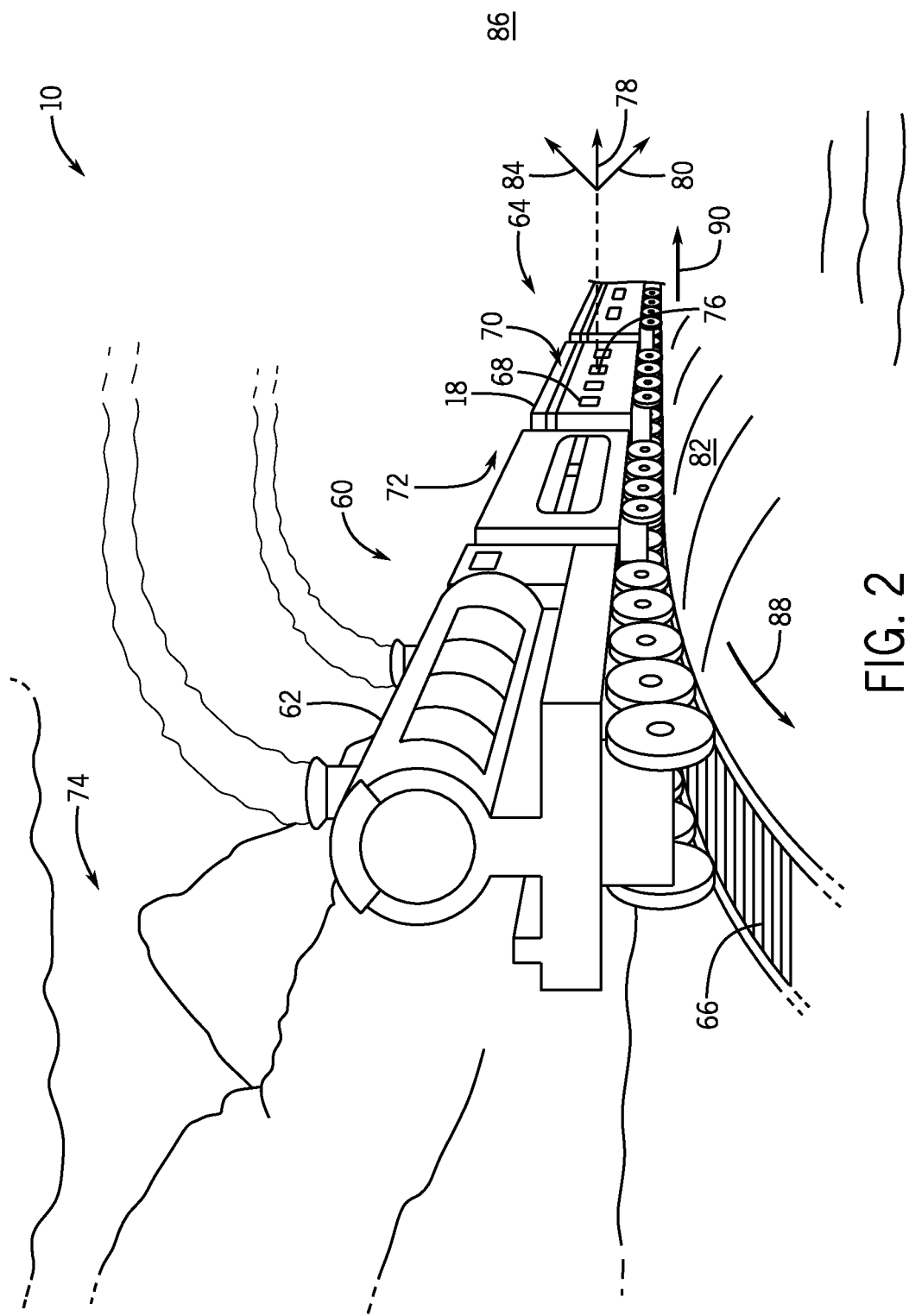
FIG. 2 illustrates a virtual representation of a part of a simulated world that is intended to be shown through the use of the immersive display system, the immersive display system being located within a ride vehicle used as a part of the simulation.

To further explain the present approaches, an example embodiment of the simulated world 10 is illustrated in FIG. 2. Specifically, FIG. 2 is a representation of the simulated world 10, as intended to be viewable by a guest from within the passenger platform 18 using the display system 24. The passenger platform 18 is contained within a real ride vehicle, which includes a train 60 as a transportation system (e.g., one or more ride vehicles). Thus, FIG. 2 shows an actual train ride positioned within the simulated world 10.

The train 60 includes a locomotive 62 and multiple passenger cars 64 that travel along a train track 66 during operation. The train track 66 may define a path between two areas of the simulated world 10, for example between the first interactive area 12 of FIG. 1 and the second interactive area 14 of FIG. 1. The passenger platform 18 may be one of the passenger cars 64, which enable guests to seemingly look out of windows 68 positioned on either lateral side of the passenger cars 64. A first side 70 of the passenger cars 64 is depicted as facing to the right of the illustration, and a second side 72 (an opposite lateral side) of the passenger cars 64 is depicted as seemingly facing a mountainous landscape 74. The mountainous landscape 74 may be viewable from an immersive window within the passenger platform 18 using the display system 24 of the present disclosure.

A point of observation 76 is depicted in the center of one of the windows 68 of the passenger platform 18. In accordance with an embodiment of the present disclosure, the point of observation 76 is not limited to a single sight line (view direction), such as a forward sight line 78. The curved display 30 may include a complex, i.e., compound, curvature including a first curvature that enables a second sight line 80, which in the illustrated embodiment may enable an observer to view a portion 82 of the simulated landscape that is situated below the observer and the passenger platform 18. Such a view direction might enable a guest to view a simulation such as the ground, water below a bridge having the tracks 66, or even the tracks 66 themselves. The compound curvature may also include a second curvature or curved portion that enables a third sight line or view direction 84, which may enable the observer to view a portion 86 of the landscape situated above the observer and the passenger platform 18.

Additional curvatures, such as a third and a fourth curvature, may enable additional sight lines/view directions. For example, a curvature disposed on one side of the display 30 may enable a passenger to view a forward direction 88, while a curvature disposed on an opposite side of the display 30 may enable a passenger to view a backward direction 90.

Figure 3:
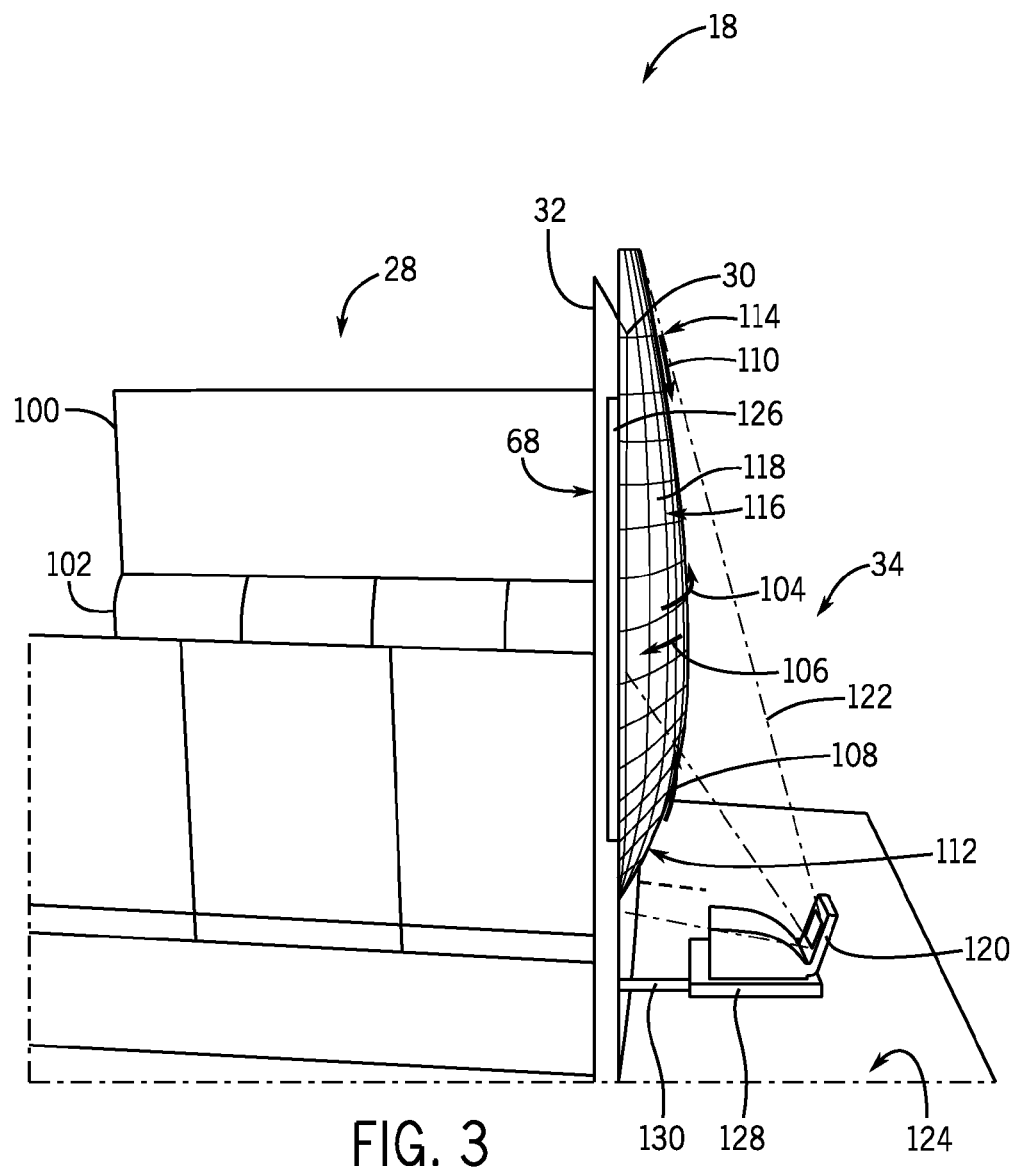
FIG. 3 illustrates an embodiment of the passenger platform of FIG. 1 including the display system having a display and projector configured to simulate an environment to a viewing area within the passenger platform through a window.

The relative positioning of observers and the configuration of the display system 24 may be further appreciated with respect to FIG. 3, which is a diagrammatical representation of the passenger platform 18 of FIGS. 1 and 2. As depicted, the wall 32 separates the viewing area 28 from the projection area 34. The viewing area 28 includes additional walls 100 forming at least a partial enclosure, which in the embodiment of the train 62 (FIG. 2) could form a cabin. Indeed, the walls 32, 100 may generally define the viewing area 28.

The viewing area 28 also includes seating 102, which enables guests to sit and view the display 30. As depicted, the seating 102 includes rows disposed at opposite sides of the display 30. Accordingly, the display 30 may be configured to provide views from multiple perspectives (i.e., vantage points) at substantially the same time. This may enable passengers on one row to view the rearward direction 90 while also (e.g., simultaneously) enabling passengers in the opposite row to view the forward direction 88. Lateral curvatures 104, 106 of the display 30 (e.g., the third and fourth curvatures noted above in FIG. 2) may enable such perspectives, when used in conjunction with appropriately processed media (discussed below).

As set forth above, the display 30 also enables simulated sight lines above and below the window 68. The simulated sight line below the window 68 may be enabled by a bottom curvature 108 of the display 30, corresponding to the first curvature noted above with respect to FIG. 2. The bottom curvature 108, in the illustrated embodiment, is a principal curvature and therefore is largely determinative of the shape of the display 30. The simulated sight line above the window may be enabled by a top curvature 110 of the display 30.

In the illustrated embodiment, the top curvature 110 has a smaller degree of curvature compared to the bottom curvature 108. The rationale for such a configuration may be further appreciated when considering that the display 30 is intended to show a landscape where the ground or a similar feature is shown below the observer, which may require a relatively high resolution. On the other hand, a sky, group of clouds, large mountains, and other similar large, relatively amorphous features would typically be above the observer. Because of this, the resolution and pixel density requirements for a realistic representation may be higher for a bottom portion 112 of the display 30 compared to a top portion 114 of the display 30.

The effect of the curvature of the display 30 on pixel density and pixel compression/stretching can be appreciated with reference to a grid (e.g., a pixel map 116), shown on the surface of the display 30. For simplicity, each rectangular or square feature 118 of the pixel map 116 may be considered to represent a pixel on the display 30. The display 30 is oriented relative to a projector 120 such that a projection cone 122 of the projector 120 is generated closer to the bottom portion 112 of the display 30 compared to the top portion 114. In other words, the bottom portion 112 of the display 30 sits deeper within the projection cone 122 of the projector 120. However, any relative arrangement of the display 30 and the projector 120 is presently contemplated. Generally, the display 30 and the projector 120 may be oriented at an oblique angle. It should be appreciated that there may, in certain embodiments, be spatial constraints when positioning the projector 120 within the projection region 34. In such embodiments, (though not necessarily only in these embodiments), it may be desirable to use a short throw projector (e.g., an ultra-short throw projector) having a suitable light engine for projecting the desired images. As an example, the light engines (light source) may include a halogen light source, a light emitting diode (LED) light source, a laser light source, a liquid crystal on silicon (LCOS) light source, or any combination thereof. Whether a projector is a short throw projector or ultra-short throw projector depends generally on the throw ratio of the particular projector, which is the ratio of the distance from projector to screen compared to the screen size. As a non-limiting example, a short throw projector may have a throw ratio of less than 1:1, such as between 0.8:1 and 0.5:1, and an ultra-short throw projector would have a throw ratio of less than 0.5:1, such as between 0.4:1 and 0.1:1.

The illustrated spatial relationship is established by mounting the display 30 to the wall 32 above a floor 124 of the projection area 34 (e.g., using a mounting device 126 of the mounting system 36 (FIG. 1)), while mounting the projector 120 to the floor 124. In the illustrated embodiment, the projector 120 is mounted below the display 30 on the floor 124 using a vibration dampening device 128. The vibration dampening device 128 may be a part of the mounting system 36 such that the display 30 and the projector 120 are mechanically coupled to one another, and thus move/vibrate by substantially the same extent (e.g., in synchrony with one another). The mounting system 36 may also include a track 130 on which the projector 120 is positioned, to enable the projector 120 to be accessed and serviced from within the viewing area 28 (e.g., via an access panel in the wall). Specifically, in one embodiment, the track 130 is configured to move the projector 120 from the projection region 34, through an opening in the wall 32 (e.g., vacated by an access panel), and into the viewing area 28.

In this configuration, the relative positions are such that there is less distance, and therefore less pixel growth, between the bottom portion 112 and the projector 120 compared to the top portion 114, as represented by the smaller size of the rectangular features 118. The pixel density, represented by the density of the rectangular features, is also higher due to this relatively shorter distance at the bottom portion 112 compared to the top portion 114. This results in a higher possible resolution for the bottom portion 112. Indeed, it is now recognized that ultra-short throw projectors may be particularly suitable for such an implementation.

Though nearly all angles at which the projection cone 122 is incident on the display 30 are oblique, the relatively large degree of curvature of the bottom portion 112 of the display 30 (compared to the rest of the display 30) results in a relatively small angle of incidence away from 90 degrees. The relatively non-steep angle of incidence (most desirable is 90 degrees) leads to relatively no pixel distortion, or a very small amount, due to the surface of the display 30. On the other hand, the steep, small oblique angle of incidence (offset from 90 degrees) of the projection cone 122 on the top portion 114 results in a greater degree of asymmetric pixel stretching for the pixels in the top portion 114.

The pixel map 116 not only illustrates the manner in which pixels are distorted by a combination of pixel growth and pixel stretching, but also depicts the manner in which media may be pre-processed (e.g., pre-distorted) so that a substantially undistorted simulation may be displayed. For example, the media (e.g., stored on the memory 44 of the control system 40) may be pre-distorted such that certain pixels of the media, if projected onto a flat screen, would appear distorted in certain sections. For example, the media may be pre-processed such that pixels that are projected onto the bottom portion 112 are pre-expanded or substantially un-distorted. This may counteract the potential for the bottom portion 112 of the display 30 to distort (e.g., compress) the pixels. Similarly, pixels projected onto the top portion 114 may be pre-distorted with additional compression of the pixels such that when projected onto the display, the pixels displayed on the top portion 114 are stretched and appear substantially undistorted. As discussed in further detail below, the sides of the display 30 are also curved to achieve a similar effect.

While most simulated environments may not require high resolution for views above the observer, in certain situations, higher resolution views may be desirable. In addition, certain simulated environments may be so large that one projector may not be sufficient to provide appropriate pixel density and resolution. Relatively large simulation areas, for example one utilizing two or more screens, may also require more than one projector. Accordingly, in some embodiments, an additional projector may be provided. In such embodiments, the additional projector may be positioned to the side of the illustrated projector 120, mounted to a ceiling of the projection area 34, or the like. It should be noted that in situations where more than one projector is utilized, a certain degree of edge blending may be appropriate so that their respective projection cones do not interfere or cause uneven illumination of the display 30. For example, in situations where the projection system 38 includes two or more projectors, the projectors may be configured to collectively project the image onto a projection surface of the display 30. The control system 40 (and/or other associated control circuitry) may be configured to cause the projection system 38 to simultaneously project partial images (e.g., stored on the memory 44) onto the display 30 to form the image, and the control circuitry may also be configured to edge blend the partial images to mask a transition from one partial image to another.

Further, while the embodiment of FIG. 3 depicts the projector 120 as being positioned on an opposite side of the wall 32 relative to the viewing area 28, in certain embodiments, the projector 120 and/or additional projectors may be mounted within the viewing area 28. The projector 120 may directly illuminate the display 30, or may project an image onto one or more reflective surfaces (e.g., one or more mirrors) that are in turn utilized to cause illumination of the display 30. The use of such reflective surfaces may be desirable to avoid placement of the projector 120 along a walking path of a guest, or to illuminate the display from an angle that is not easily achievable using only the projector 120.

In addition, the use of reflective surfaces is also presently contemplated in configurations similar to the illustrated embodiment. For example, the projector 120 may instead be mounted to a ceiling of the projection area 34, and a mirrored surface may reflect the projection cone 122 from a direction that is substantially perpendicular relative to the wall 32. This type of projection may reduce pixel stretching and keystoning resulting from surface illumination at steep angles.

While the projector 120 may be positioned in different areas, it should be noted that locating the projector 120 within the viewing area 28 may be undesirable, as the ability of the projector 120 to illuminate the display 30 may be reduced (e.g., at the edges of the display 30). Indeed, it is now recognized that in addition to providing views from multiple perspectives, it may also be desirable to terminate view directions (i.e., the largest angle and sight lines at which an observer can unimpededly view the display 30, without a substantial reduction in image quality) outside of a viewable region of the window 68.

Figure 4:
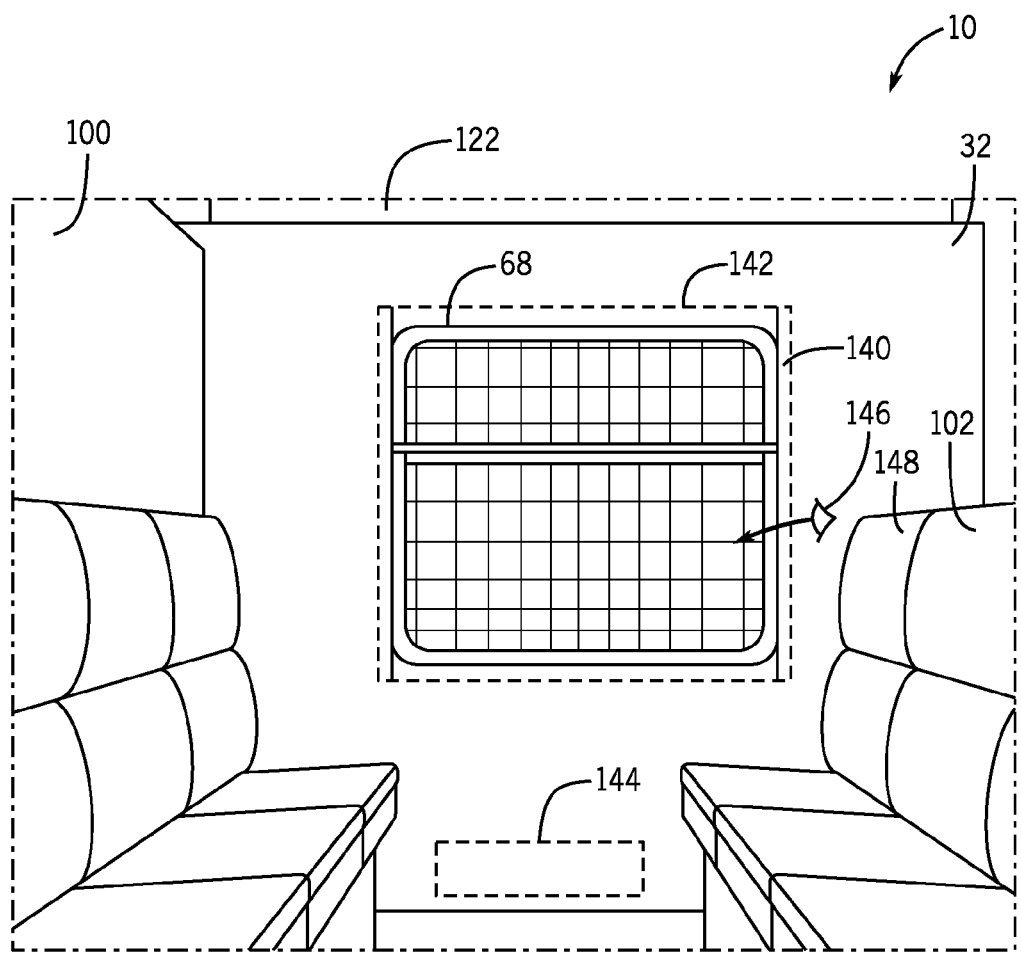
FIG. 4 illustrates a view of the window and the display of FIG. 3 from a perspective within the viewing area.

For example, in addition to the compound curvature of the display 30, which is described in further detail below, the display 30 may include view cones (e.g., the combination of view directions from the viewing area 28) that terminate beyond the extents of the window 68. Referring now to FIG. 4, another view of the passenger platform 18 from the perspective of the viewing area 28 is provided. As depicted, the window 68 includes a frame 140, which may be present for aesthetic and functional purposes. For example, the frame 140 may be used to mask imperfections in the display 30 by blocking selected portions of the display 30 from view. In addition, the frame 140 may be considered to be a boundary of the opening 26 (e.g., filled by a window pane of transparent or translucent material) forming the window 68. As depicted by the dashed line behind the window 68, the display 30, situated behind the opening 26 such that a large portion of it is viewable through the opening 26, includes edges 142 that extend beyond the frame 140. In other words, the display 30 is larger than the opening 26 such that its edges 142 extend beyond the extents of the opening 26 of the window 68.

As also depicted, the projection cone 122 of the projector 120 (FIG. 3) is larger than the window 68 and the display 30. The position of the projector 120 can be approximated with reference to the dashed box between the seating 102, which represents a panel 144 through which the track system 130 and the projector 120 may be accessed. Thus, the projection cone 122 is able to illuminate all portions of the display 30. The illumination of the display 30 and the extension of the edges 142 of the display 30 beyond the window 68 (e.g., the frame 140) may enable termination of the view cone from a number of perspectives beyond a range that is viewable from within the viewing area 28.

For example, in the view of FIG. 4, the observer is looking straight through the opening 26 of the window 68 and into the display 30 (e.g., normal relative to the center of the display 30). The bottom curvature 108 of the display 30 provides a simulated view of a portion of the landscape situated below the observer and maintains its inward (relative to the wall 32) curvature beyond the view of the observer. Similarly, the lateral curvatures 104, 106 provide simulated views to the left and right of the observer by continuing their curvature beyond the viewing range of the observer. Indeed, the observer, from the perspective depicted in FIG. 4, is unable to see the terminus of any viewing cone of the display 30, thereby creating a seemingly "infinite" landscape.

A side perspective 146, for example from a seat 148 next to the window 68, is also enabled by the display 30. Indeed, the side perspective 146 provides an additional view of the simulated environment enabled by the increased viewing range from the seat 148. Specifically, the side perspective 146 increases the ability of an observer to see a side portion of the display 30 positioned behind the wall 32, beyond the extents of the window 68. Such a perspective may be further appreciated with reference to FIG. 5.

Figure 5:
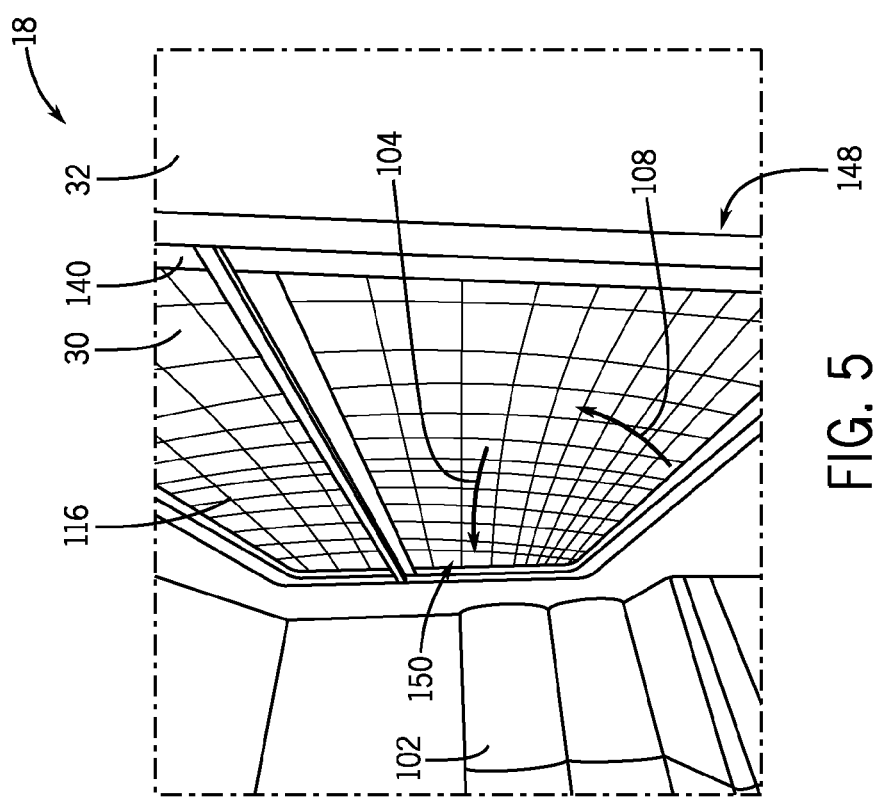
FIG. 5 illustrates a view of the bottom corner of the window and the display of FIG. 3 from a perspective having a large angular offset relative to the window.

Specifically, FIG. 5 is a depiction of the viewing area 28 from the side perspective 146, illustrating a view direction toward a lower left corner of the window 68. From the pixel map 116, it can be seen that the bottom curvature 108 produces a "shelf" effect, where, from the side perspective 146, a bottom portion 148 of the window 68 appears to continue infinitely downward (from the perspective 146 of the observer), and in toward the observer. The pixel map 116 also shows that the lateral curvature 104 provides a surface portion 150 facing or otherwise curving toward the observer (i.e., curving to approach a normal/perpendicular angle relative to the direction of the side perspective 146), and appearing to extend beyond the observer. This may enable the display 30 to provide a view of the simulated landscape in a manner that appears to be in a forward direction of travel, such as the direction 88 in FIG. 2.

As also depicted in the pixel map 116, pixel density and the resulting resolution of the display 30 may also be highest in the region of the display 30 corresponding to an area of a simulated path of travel. That is, the highest pixel density and corresponding resolution of the display 30 may be highest in the region of the display 30 where the observer is most likely to focus (i.e., the surface portion 150 for the side perspective 146). On the other hand, the top portion 114 of the display 30, where the observer is least likely to focus and which is least likely to include high-resolution simulations, has a lower pixel density compared to the lower portion 148. Again, configurations where more than one projector is used to enhance surface coverage and/or resolution are also contemplated, for example when higher resolution simulations are desired at the top portion 114.

Figure 6:
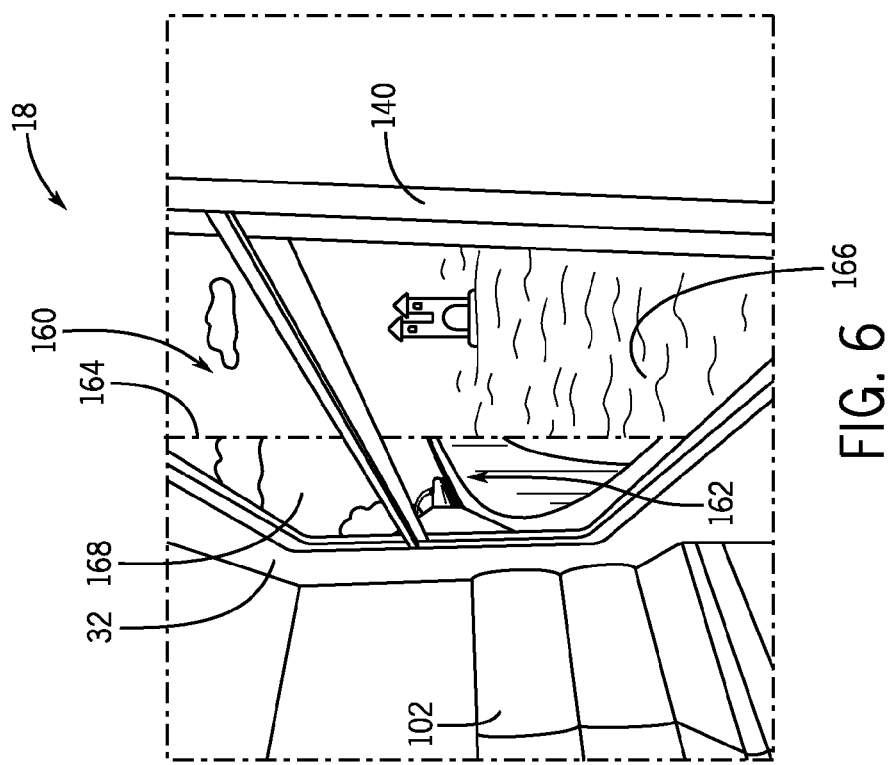
FIG. 6 illustrates the same view as in FIG. 5, but with an example of a simulated environment viewable on the display through the window.

An example of a simulated environment 160 generated for the passenger platform 18, as viewed from the side perspective 146 (FIG. 3) is depicted in FIG. 6. Specifically, FIG. 6 is intended to represent the configuration of FIG. 5 where the simulated environment 160 has replaced the pixel map 116. As illustrated, the displayed simulated environment 160 includes a simulation of a forward path 162. The forward path 162 may be replaced by another simulation in other embodiments, for instance where the simulated direction of travel is not horizontal, but vertical.

The forward path 162 includes a simulation of the locomotive of the train, a simulation of train tracks, and the like. Again, this portion of the simulation may be enabled by the surface portion 150 formed by the lateral curvature 104 of the display 30, which faces toward the observer at an angle closer to 90 degrees compared to the rest of the display 30.

Because a common media source is used for the simulation (e.g., multiple views are provided using a single projection cone 122), the simulation transitions, depicted as a dashed line 164, into a view of the landscape from the perspective shown in FIG. 4. This transition is enabled by the curvature of the display 30 such that the display 30, on the right side of the dashed line 164, projects at an angle that is substantially normal to the view direction from the perspective of FIG. 4.

The simulated environment 160 also includes a water simulation 166 situated below the observer. Generally, simulations of a dynamic medium such as water may benefit from enhanced resolutions. As such, the bottom curvature 108 may be used for this purpose. The simulated environment 160 further includes a sky simulation 168, which may simply include clouds, distant birds, or the like. These simulations may not necessarily benefit from higher resolutions and, therefore, the upper curvature 110 may be suitable for the sky simulation 168.

In accordance with certain embodiments, the simulated environment 160 is dynamic at least in a direction of travel. Thus, in the illustrated embodiment, the simulated environment 160 is dynamic, i.e., changes, at least in the horizontal direction in synchrony with the simulated or real movement of the passenger platform 18. In other situations, such as when the simulated direction of travel is vertical, the simulated environment 160 may be dynamic at least in the vertical direction.

Figure 7:
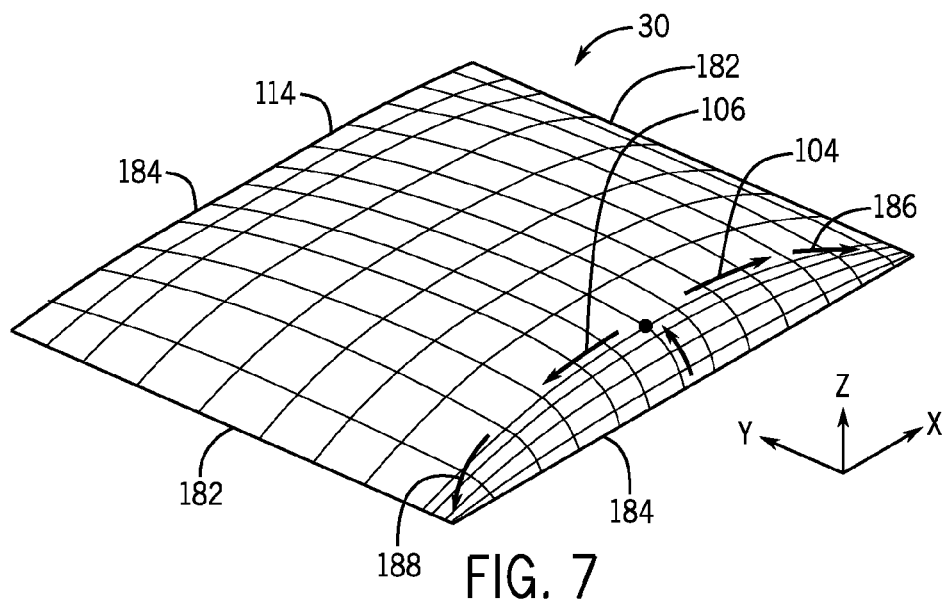
FIG. 7 illustrates an isometric view of the display of FIGS. 3-6.
Figure 8:
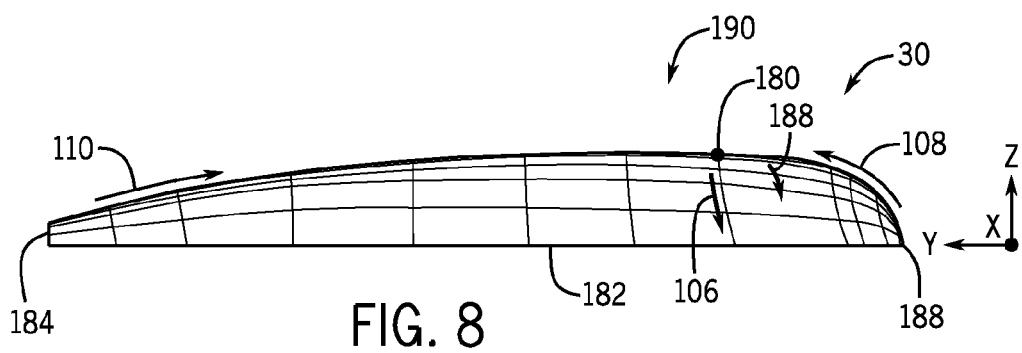
FIG. 8 illustrates a side view of the display of FIGS. 3-7.
Figure 9:
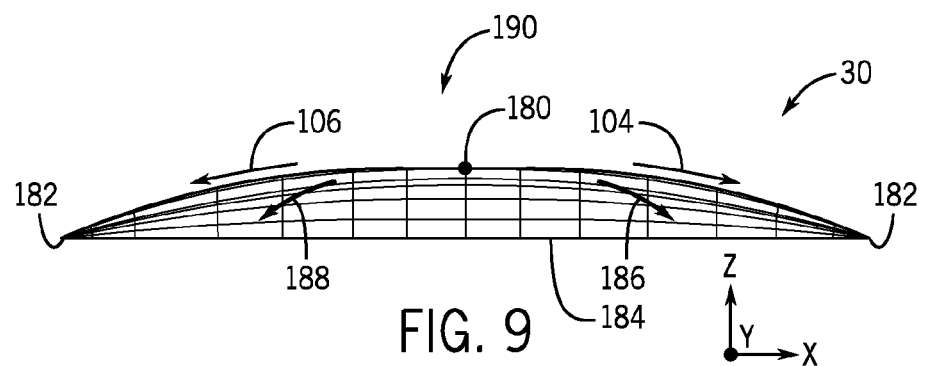
FIG. 9 illustrates a bottom view of the display of FIGS. 3-8.

In view of the foregoing, it should be understood that the shape of the display 30 can be a major factor in implementing the techniques of the present disclosure. FIGS. 7-9 depict different views of an embodiment of the display 30. Specifically, FIG. 7 is an isometric view of an embodiment of the display 30 having at least two principal curvatures—the bottom and top curvatures 108, 110 and the lateral curvatures 104, 106 (which together may form a single, large curvature or may remain separate).

In FIG. 7, the display 30 is depicted as including the bottom curvature 108 as a first principal curvature having the greatest degree of curvature compared to the other portions of the display 30. The bottom curvature 108 is also not symmetrical. That is, the bottom curvature 108 has a changing degree of curvature moving toward a maximum point 180 (e.g., a point of maximum height in the Z-direction, or maximum bulge) that is offset from the center of the display 30.

The bottom curvature 108 can also be considered to be defined as a curvature relative to a plane formed by the height and width of the display 30, shown in the coordinate as the X-Y plane. Thus, the displacement away from the X-Y plane, i.e., along the Z-axis moving along the X-Y plane, is not symmetrical. The bottom curvature 108 may also be defined as a curvature along a plane (the Y-Z plane) oriented orthogonal to the X-Y plane (the plane formed by the overall height and width of the display 30). Again, this curvature provides a relatively high resolution for the bottom portion 112 of the display 30.

Moving away from the maximum point 180 of the display 30 along the illustrated X-axis (i.e., parallel to top and bottom edges 182 of the display 30), the Z-displacement reduces. In the illustrated embodiment, the Z-displacement (e.g., degree of bulge) of the display 30 decreases symmetrically moving in either direction along the X-axis away from the maximum point 180 and toward the top portion 114, resulting in a second principal curvature.

It can also be appreciated with reference to FIG. 7 that additional curvatures are also present. For example, moving along the Y-axis (e.g., along the height of the display 30) from the maximum point 180 to the edge 184 of the bottom portion 112, the lateral curvatures 104, 106 are, instead, diagonal curvatures 186, 188 converging toward respective corners of the bottom portion 112 of the display 30 formed between the lateral and bottom edges 182, 184. The diagonal curvatures 186, 188 may enhance simulation at regions proximate the corners of the display 30. The corners may be visible, for example, when looking from the side perspective 146 of FIG. 4. Indeed, such curvatures back toward the wall 32 at the extents of the display 30 may create additional possible view directions from perspectives positioned at sharp angles relative to certain portions of the display 30.

The first and second principal curvatures are depicted in FIGS. 8 and 9, respectively. In FIG. 8, the maximum point 180 is depicted as being closer to the bottom portion 112 of the display 30 than the top portion 114. Indeed, the maximum point 180 (i.e., the point having a maximum displacement relative to the X-Y plane defined by the edges of the display 30) may be between 1% and 50% of the distance between the bottom edge and the top edge, such as between 10% and 40% of the distance, or between 20% and 35% of the distance. As a further example, the maximum point 180 may be between 0% and 50%, exclusive (i.e., not including 0% and not including 50%), of the distance.

In addition, because the degree of Z-displacement may determine, at least partially, how immersive the display 30 is, a greater displacement in the Z-direction (i.e., display depth) may be desirable. Generally, the depth of the display 30 may be limited by the available space in the projection area 34 and the capabilities of the projection equipment. Further, while any depth of the display 30 is possible and contemplated herein, in certain embodiments the depth may be between 1% and 25% of the height or width of the display 30, as measured along the edges 182, 184, respectively.

The depiction of the first principal curvature (i.e., curvature 108) in FIG. 8 also includes a middle portion 190 positioned toward the center of the surface of the display 30, which may be substantially planar, yet may also be angled relative to the wall 32 at an oblique angle. As may be appreciated in view of the foregoing discussion, the middle portion 190 may be utilized to provide a head-on view of a simulated environment, such as from the perspective depicted in FIG. 4. Indeed, the relatively flat middle portion 190 (e.g., not having a large curvature, such as less than 10% or less than 5% in the Z-direction) enables pixels to be displayed without an appreciable amount of pixel stretching or other distortion.

The middle portion 190 of the display 30 couples the bottom curvature 108 with the top curvature 110, which is also depicted in FIG. 8 as being oriented along the Y-Z plane. However, unlike the bottom curvature 108, the top curvature 110 does not result in a bulge of the display 30 in the top portion 114, but does transition to its own local maximum. Specifically, the top curvature 110 transitions to the middle portion 190. Indeed, for the purposes of the present disclosure, the middle portion 190 may be considered to terminate and join the bottom and top curvatures 108, 110.

Such a curvature is appropriate for embodiments where the projector 120 (FIG. 3) is positioned below the display 30, and where higher resolution is desired for the bottom portion 112 of the display 30. However, in embodiments where equal or higher resolution is desired for the top portion 114, the top portion 114 may mirror the bottom portion 112, and may also include a maximum point causing a bulge in the display 30. In such embodiments, the display 30 may appear to be symmetrical about the X-Z plane running through the midpoint of the display as measured along the Y-axis. However, the degree of bulge of the display 30 at the bottom and top portions 112, 114 may be different.

The second principal curvature, e.g., the lateral curvatures 104, 106 are depicted in FIG. 9. The lateral curvatures 104, 106 may be considered to be curvatures that are disposed along a plane oriented orthogonal relative to a plane defined by the edges 182, 184 of the display 30, and along the width direction (i.e., X-axis) of the display 30. As noted above, the lateral curvatures 104, 106 may combine to produce the second principal curvature, and are formed by a symmetrical reduction in the Z-displacement moving from the Y-Z plane positioned at the midpoint of the display 30 as measured along the width (X-axis), toward the top portion 114. The middle portion 190 can also be seen as a relatively flat surface of the display 30.

Generally, the rate of reduction in the Z-displacement, which changes and therefore defines the lateral curvatures 104, 106, increases toward the lateral edges 182. The degree of curvature defined thereby is less than the degree of curvature of the bottom curvature 108. However, the lateral curvatures 104, 106 are nevertheless capable of enabling the display 30 to simulate views from additional perspectives (present simulations from different vantage points), with the view cone of the display 30 limited by the presence of the wall 32 or the frame 140 of the window 68 (FIG. 4).

While the particular shape of the display 30 depicted in FIGS. 7-9 is demonstrative of one embodiment of the display 30, other shapes and modifications thereof are possible. Indeed, the particular location of curvatures, location of maximum points, degrees of curvature, and so forth, may be dependent upon a number of factors, as set forth above. The relative positioning between the display 30 and the projector 120, the size of the display 30 relative to the size of the projection cone 122, the intended simulations to be provided on the display 30, and the possible vantage points/perspectives/view directions from which the display 30 is intended to be viewed are just some of the considerations taken into account in developing the displays disclosed herein.

Figure 10:
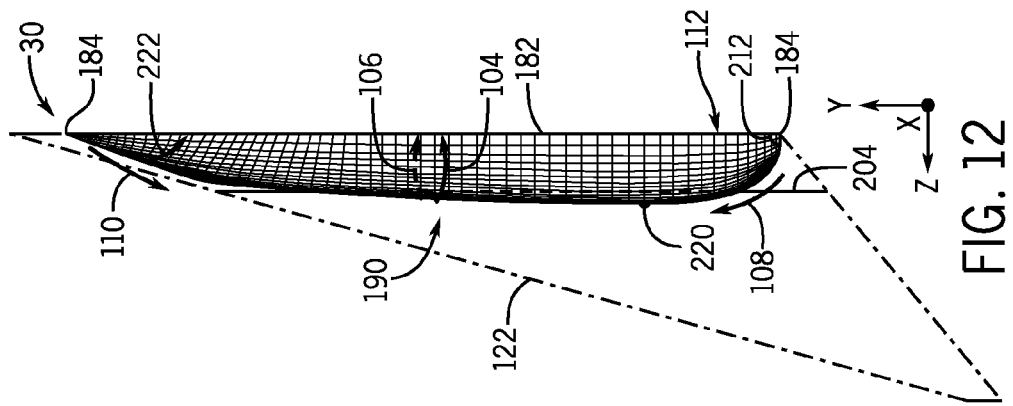
FIGS. 10-14 illustrate a side view of different embodiments of the display of FIGS. 3-6.
Figure 11:
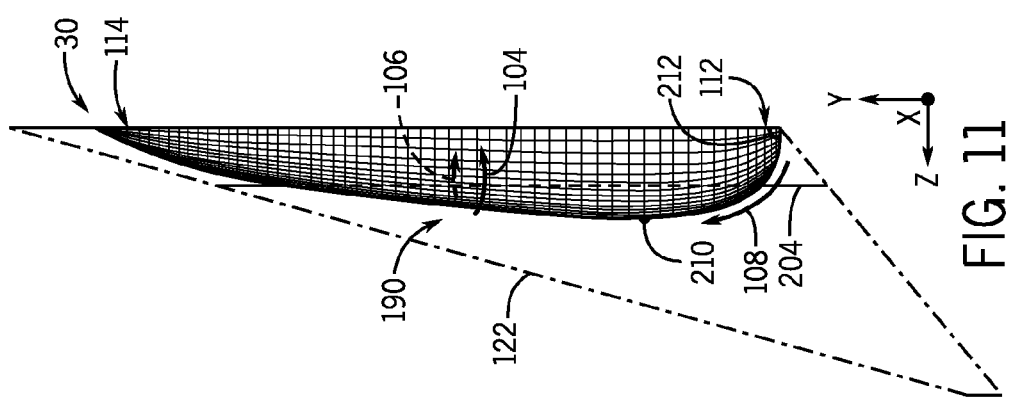
Figure 12:
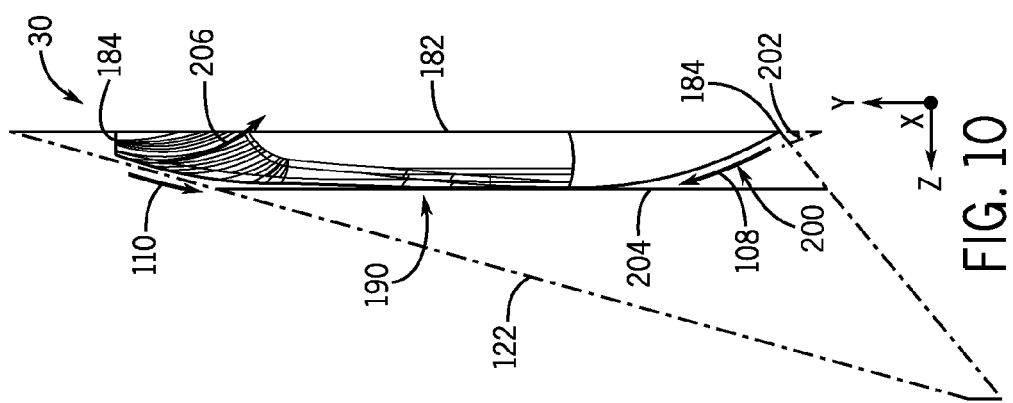

FIGS. 10-12 illustrate embodiments of the display 30 having different degrees of curvature, sizing, depth, and so on. In addition, the displays 30 are depicted relative to the projection cone 122 provided by the projector 120 as a common reference.

Referring to the embodiment of the display 30 in FIG. 10, the display 30 is illustrated as including a bottom portion 200 having a relatively sharp angle 202 relative to the plane defined by the edges (or the height and width) of the display 30 (i.e., the X-Y plane). The middle portion 190 corresponding to the relatively less-curved portion of the display 30 also accounts for a large portion of the display 30. For instance, over 50% of the surface area of the display 30 of FIG. 10 may correspond to the middle portion 190. Such a relatively large middle portion 190 may be desirable for providing relatively large simulations for view directions converging toward the middle portion 190 of the display 30 (e.g., including parallel or oblique angles less than 90 degrees relative to the Z-axis). As shown by reference line 204, the middle portion 190 is also generally parallel in relation to the X-Y plane, meaning that the angle of incidence of the projection cone 122 against the surface of the display 30 will be approximately equal to the angle at which the projector 120 (FIG. 3) is projecting relative to the wall 32 (FIG. 3).

The display 30 of FIG. 10 also includes diagonal curvatures 206 positioned at the top portion 114 of the display 30. As depicted, the diagonal curvatures 206 diverge away from a longitudinal midline of the display 30 (i.e., the midline running along the height as measured along the X-axis) and toward a lateral midline of the display 30 (i.e., the midline running along the width as measured along the Y-axis). The diagonal curvatures 206 may create a principal curvature for the top portion 114 of the display 30, where the top curvature 110 creates a maximum displacement (e.g., bulge) of the surface in the direction of the Z-axis (e.g., depth) of the display 30 along the longitudinal midline, and gradually decreases the displacement along the direction of the Z-axis toward the lateral edges 182.

The display of FIG. 10 may be desirable, for example, in a situation where relatively higher resolution simulations are desirable for the middle and top portion 112 of the display 30. Such a simulation may be implemented in, for example, simulated travel in a space shuttle or space ship, or for interactions with a guest.

In addition, the relatively sharp angle 202 of the bottom portion 200 created by a small Z-displacement of the bottom curvature 108 generally aligns the projection surface of the display 30 (i.e., the surface onto which the projection cone 122 is incident) with the angle at which the projection cone 122 is generated, thereby reducing pixel distortion and enhancing potential resolution. However, because the Z-displacement (depth) of the bottom curvature 108 is relatively small compared to the Z-displacement of the remaining portions of the display 30, the bottom portion 200 may not seem to be as immersive as the remaining portions.

In this regard, an embodiment of the display 30 having a large Z-displacement created by the bottom curvature 108 is depicted in FIG. 11. As can be seen in the illustration, the display 30 of FIG. 11 includes a large bottom curvature 108, which serves as one of the principal curvatures of the display 30. Indeed, the general shape of the display 30 of FIG. 11 is similar to the shape of the display 30 of FIGS. 7-9, albeit with a larger Z-displacement by the bottom curvature 108, and larger degrees of curvature for the lateral curvatures 104, 106.

Like the embodiment of FIGS. 7-9, the display 30 of FIG. 11 includes a maximum point 210 positioned closer to the bottom portion 112 than the top portion 114. The result of the large Z-displacement of the bottom curvature 108 is that the bottom portion 112 of the display 30 penetrates deeper into the projection cone 122, which may enable enhanced pixel density and corresponding enhanced resolution. However, by being placed deeper into the projection cone 122, the display 30 may not be positioned at an ideal focus plane of the projector 120, which may, in certain embodiments, result in unwanted blurring of the projected image. Indeed, because the bottom curvature 108 is such that the surface of the display 30 is nearly at a 90 degree angle 212 relative to the X-Y plane, the display 30 may provide a relatively large, well-resolved simulation of environments situated below the observer. This enhanced simulation at the bottom portion 112, however, must be carefully balanced with the arrangement of the middle portion 190 of the display 30, which is angled relative to the X-Y plane. In the illustrated embodiment of FIG. 11, the steep angle of incidence of the projection cone 122 onto the middle portion 190 may cause pixel distortion, such as pixel stretching/keystoning. Indeed, the surface of the display 30 is nearly parallel with the projection cone 122 in some areas of the middle portion 190.

In addition, while such a large curvature for the bottom portion 112 may be desirable for enhanced immersion, there may be spatial constraints when considering the shape of the display 30. For example, on a passenger platform (e.g., platform 18), space outside of the viewing area 28 may be limited, meaning that the display system 24 should be compact in addition to having desirable depth. FIG. 12 depicts an embodiment of the display 30 having a smaller Z-displacement by the bottom curvature 108 compared to the display 30 of FIG. 11. However, the display 30 of FIG. 12 still includes a maximum point 220 that is produced by the bottom curvature 108 such that the bottom portion 112 is deeper (from the perspective of the observer) compared to other portions of the display 30. Indeed, the bottom portion 112 extends in the direction of the Z-axis (i.e., normal to the plane of the display defined by its edges 182, 184) beyond the reference line 204, and then curves back toward the reference line 204 in establishing the flat middle portion 190. As depicted, the middle portion 190 of the display 30 of FIG. 12 slants back toward the top edge 184 at a relatively smaller angle with respect to the reference line 204 compared to the display of FIG. 11.

Thus, the overall shape of the display 30 of FIG. 12 may enable large and well-resolved simulations at view directions having oblique inclination and offset angles relative to the X-Y plane of the display 30, which are discussed in further detail below. In addition, diagonal curvatures 222 positioned toward the top portion 114 of the display 30 enable simulations at perspectives having view directions toward the top corners formed by the intersection of the edges 182, 184 at the top portion 114. The diagonal curvatures 222 diverge away from the longitudinal midline of the display 30, as measured along the X-axis running parallel to the top and bottom edges 184, and toward the middle portion 190 of the display 30.

Figure 13:
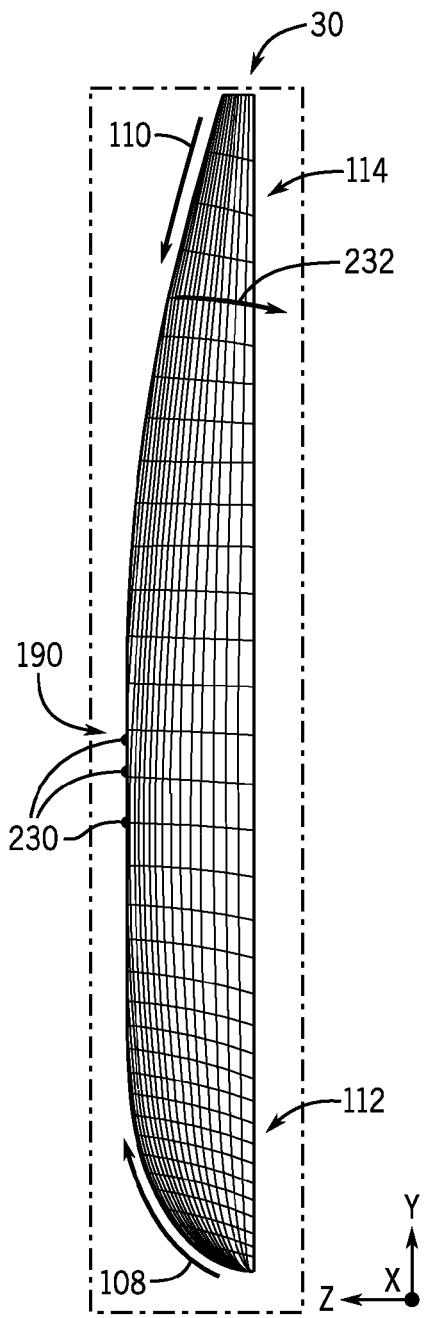

Certain embodiments of the display 30 may combine desirable portions of the displays of FIGS. 10-12. For example, an embodiment of the display 30, as depicted in FIG. 13, may include a relatively (though not completely) flat middle portion 190. The display 30 of FIG. 13 also includes a highly curved bottom portion 112. However, unlike the embodiments of FIGS. 11 and 12, a maximum point 230 of the display 30 corresponds to a section within the middle portion 190 of the display 30, as opposed to a section within the bottom portion 112 defined by the bottom curvature 108. The maximum depth of the display 30 of FIG. 13, therefore, is in the middle portion 190.

The display 30 of FIG. 13 also includes diagonal curvatures 232 disposed at opposite lateral sides of the display 30 at the top portion 114. The diagonal curvatures 232 diverge away from the longitudinal midline of the display 30, as measured along the X-axis running parallel to the top and bottom edges 184, and toward the middle portion 190 of the display 30 (e.g., as represented by the plane of the page). While this might enable an enhancement in the immersiveness of the top portion 114, the diagonal curvatures 232 must also be carefully balanced with unwanted stretching/keystoning of the pixels in this area.

In addition, compared to the embodiments of FIGS. 11 and 12, the depth of the bottom portion 112 is reduced. The reduced depth of the bottom portion 112 may result in simulations of environments situated below the observer not being as immersive as those having larger Z-displacements by the bottom curvature 108, such as the displays of FIGS. 11 and 12.

Figure 14:
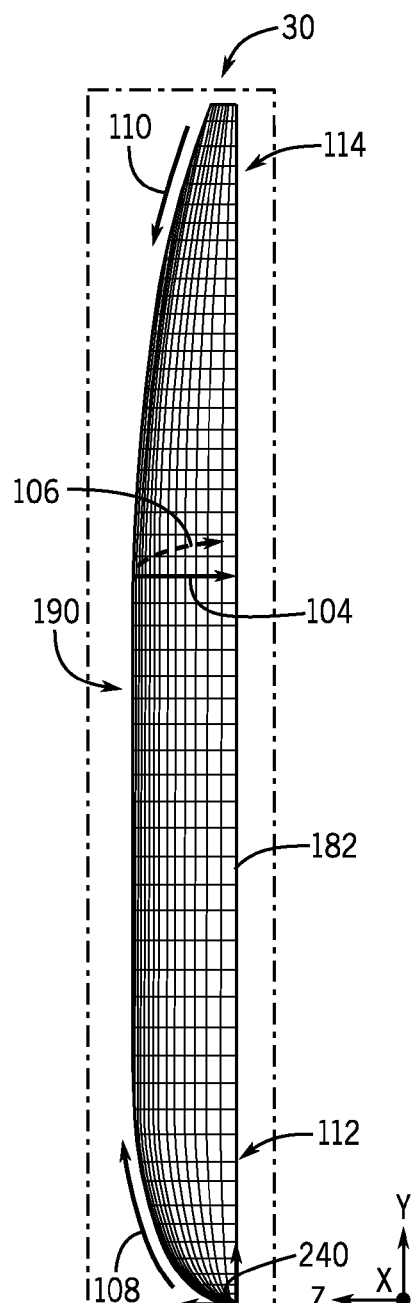

The embodiment of the display 30 depicted in FIG. 14 is similar to the embodiment of FIG. 13, except that it does not include the diagonal curvatures 232, and includes a shallower bottom portion 112 created by the bottom curvature 108. The middle portion 190 is also more planar than the embodiments depicted in FIGS. 11-13, and is substantially parallel to the X-Y plane. Indeed, the middle portion 190 extends for over 50% of the height (i.e., along the Y-axis) of the display 30, thereby creating a larger viewing surface and viewing cone (i.e., a larger number of perspectives that can view the middle portion 190).

Further, the display 30 is substantially free of diagonal curvatures at the top portion 114, which may sacrifice the ability of the display 30 to have a surface oriented at an angle closer to normal (closer to 90 degrees) relative to a perspective looking at a top corner of the display 30. However, the display 30 may be less susceptible to pixel distortion at the top portion 114 compared to the embodiment depicted in FIG. 13.

The bottom curvature 108 of the display 30 of FIG. 14 is such that a sharp angle 240 from the edge 184 at the bottom portion 112 is formed, relative to the X-Y plane aligned with the lateral edges 182. The angle 240 is such that the bottom portion 112 has a sharp initial Z-displacement, forming a shelf-like effect. The shelf-like effect can be used to simulate environments that appear to extend directly underneath the observer along a parallel plane relative to the plane of the floor of the passenger platform 18. As an example, the shelf-like effect may be used to simulate a body of water extending underneath the passenger platform 18.

For a window-like effect, such as might be desirable in a simulated transport, the display 30 illustrated in FIGS. 3-9 may provide an appropriate balance of bottom portion depth (i.e., Z-displacement resulting from the bottom curvature 108), angle of the middle portion 190, and top curvature 110. However, it should be noted that a display produced in accordance with the present disclosure may combine any one or a combination of the above curvatures, angles, and so on, to address a particular requirement specific to a task or setting. Indeed, the present disclosure is intended to encompass any and all combinations of the shapes, angles, curvatures, and so on, described above.

Therefore, in a general sense, it should be appreciated that the display 30 includes curvatures (e.g., curvatures in at least two directions oriented at non-zero angles relative to one another) that enable the surface of the display 30 to present visual media from a number of different directions. Indeed, all of the displays 30 set forth above may be described not relative to a view perspective, but based on relative directions in which the visual media is presented.

For example, the bottom portion 112, top portion 114, and middle portion 190 of the embodiments of the display 30 described above enable the display 30 to present visual media from different directions. The direction at which the media may be presented, referred to herein as the presentation direction, may be considered to be a combination of an angle of inclination/declination relative to a display normal 250, and angle of offset relative to the display normal 250, as shown in FIG. 15. Specifically, FIG. 15 depicts an embodiment of the display system 24 including the embodiment of the display 30 described above with respect to FIGS. 7-9. In this embodiment, the display normal 250 may be considered to be a normal vector from the maximum point 180 (e.g., surface maximum). In embodiments where the middle portion 190 corresponds to the maximum depth, then the central point of the middle portion 190 may be considered to be the point that determines the display normal 250. Generally, if the edges 182, 184 of the display 30 are parallel to the wall 32 to which the display 30 is mounted, the display normal 250 will also be normal to the wall 32 and parallel to the floor 124.

In the illustrated embodiment, most portions of the display 30 above the maximum point 180 have an angle of declination that decline toward the display normal 250, and most portions of the display 30 below the maximum point 180 have an angle of inclination that incline toward the display normal 250. Because of the dynamic nature of the top curvature 110, the angles of declination above the maximum point 180 all become increasingly small in magnitude, as shown by first and second declining angles 252, 254. Conversely, the angles of inclination below the maximum point 180 all become increasingly larger due to the dynamic nature of the bottom curvature, with the upper limit of 90 degrees in magnitude, as shown by first and second inclining angles 256, 258.

Similarly, moving laterally from the height midline of the display 30 (as represented by the plane of the page), the offset angles generally increase due to the lateral curvatures 104, 106. In addition, the diagonal curvatures 186, 188 cause a change in angle of declination/inclination in addition to the change in angle of offset.

It should be appreciated that the various combinations of angles of inclination/declination and angles of offset for the different portions of the display 30 result in a plurality of presentation directions. The plurality of presentation directions may be considered to be changing from a perspective moving along at least two axes of the display 30. In other words, the direction at which media is presented by the display 30 changes when moving along the surface of the display 30 in at least two directions oriented crosswise relative to one another. For example, the display 30 of FIG. 15 provides changing presentation directions moving along the surface of the display 30 from the bottom portion 112 to the top portion 114, moving laterally along the display 30 (e.g., parallel to edges 184), and moving in a variety of diagonal directions along the display (e.g., at oblique angles relative to the edges 184). In this way, the display 30 provides changing presentation directions in at least two directions, at least three directions, or more.

These varying presentation directions all work in concert to enable the display to have a viewing cone (e.g., the combination of all possible directions from which the simulation provided by the display 30 can be viewed, unassisted, from the viewing area 28) that is not limited by the shape of the display 30, but is limited by the viewing range established by the physical constraints of the viewing area 28. For example, the wall 32 physically constrains the directions from which the display 30 can be viewed through the opening 26 (FIG. 1), but the display 30 terminates is viewing cone outside of this range because of the changing presentation directions. As discussed above, this creates a seemingly infinite landscape when viewed through the opening 26.

Furthermore, it should be noted that the positions of the display 30 and the projector 120 relative to the wall 32 are not limited to the descriptions set forth above. As shown in FIG. 15, the projector 120 may be tilted backward (e.g., the top of the projector 120 moves away from the wall 32 while the bottom of the projector 120 remains at substantially the same position). However, moving the projector 120 in this way may cause steeper angles of incidence of the projection cone 122 on the display 30 at the top portion 114, which can cause pixel stretching and blurriness.

Additionally or alternatively, the display 30 may be tilted such that its bottom portion 112 moves closer to the projector 120, as shown in FIG. 16. Indeed, in FIG. 16, the projector 120 is tilted forward. In causing the displacement of the bottom portion 112 and the sides of the display 30 away from the wall 32, gaps may be created that enable certain sight lines to reveal the lateral edges 182 of the display 30.

Figure 17:
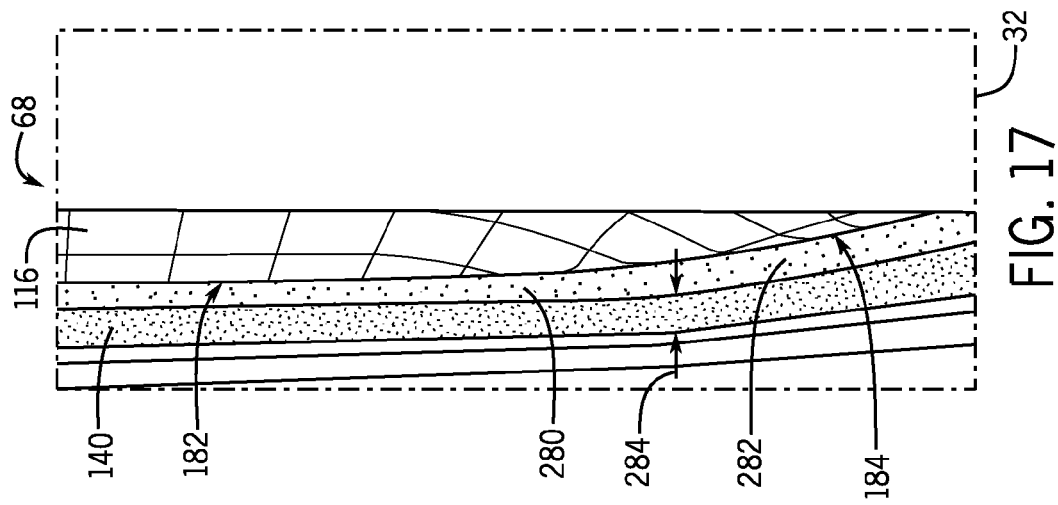
FIG. 17 illustrates a view of a bottom corner of an embodiment of the window of FIG. 3 from a perspective having a large angular offset relative to the window, showing gaps formed from an insufficient degree of curvature of an embodiment of the display.

In this regard, the present disclosure also provides certain techniques for masking gaps caused by insufficient display curvature, and/or movement of the display 30 relative to the opening 26. Referring now to FIG. 17, a view direction from a similar perspective as shown in FIG. 4 is provided, where the pixel map 116 is produced using the display 30 of FIG. 10. As shown in the embodiment of the window 68 of FIG. 17, the display 30 does not terminate its view cone beyond the extent to which the display 30 can be seen through the opening 26. Lateral gaps 280 may be formed between the frame 140 of the window 68 and the lateral edges 182 of the display 30. Similarly, depth gaps 282 may be formed between the top and bottom edges 184 of the display 30 and the frame 140. In other words, the edges 182, 184 are visible, reducing the immersiveness of the window 68.

Figure 18:
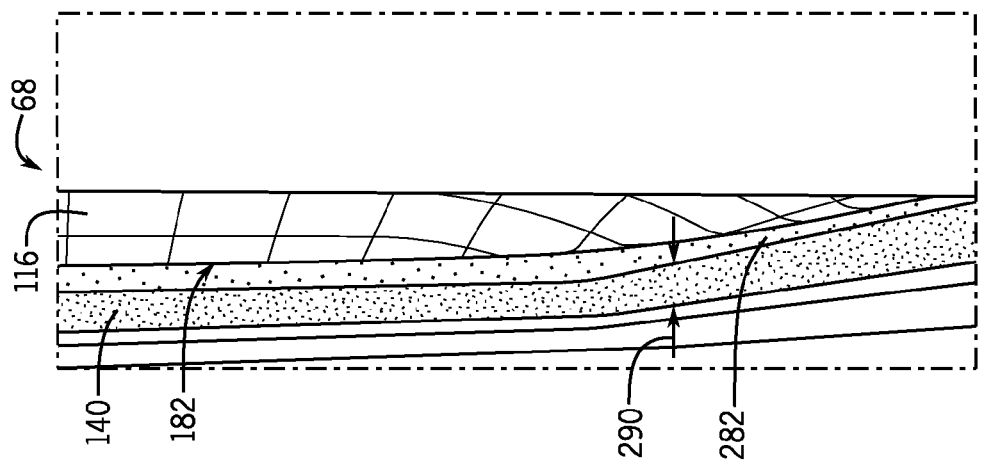
FIG. 18 illustrates the same view as FIG. 17, but having a deeper window ledge configured to mask the gaps formed from the insufficient degree of curvature of the embodiment of the display.

To counteract the formation of these gaps, aside from using a different display 30, one solution includes adjusting a depth of the frame 140. For instance, in FIG. 17, the frame 140 has a first depth 284 that may be adjusted, as shown in FIG. 18, to a second depth 290. As a result, the size of at least the depth gap 282 is reduced, which enhances the immersive effect of the display 30.

Figure 19:
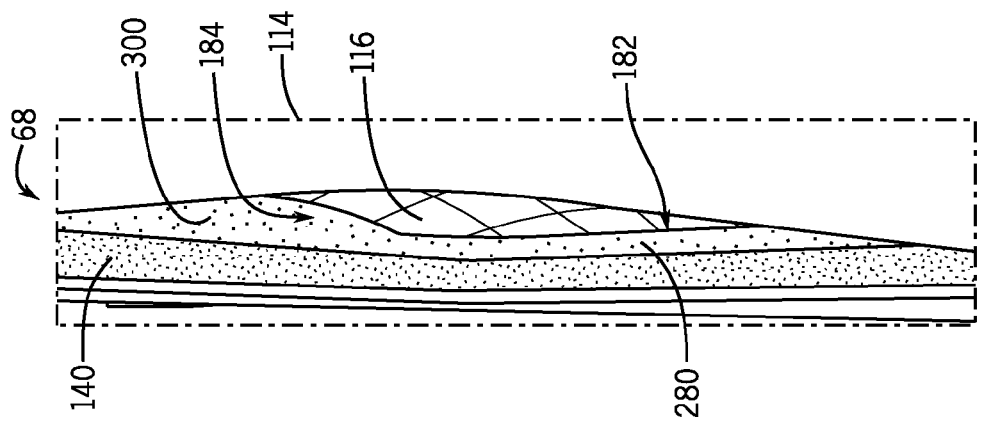
FIG. 19 illustrates a view of a top corner of the window and display of FIG. 17 from a perspective having a large angular offset relative to the window, showing gaps formed from an insufficient degree of curvature of an embodiment of the display.

Similar issues may be seen at the top portion 114 of the display 30, as shown in FIG. 19. Specifically, in FIG. 19, a top gap 300 is seen between the edge 184 at the top portion 114 and the frame 140. Accordingly, it should be appreciated from the depiction in FIGS. 18 and 19 that adjusting the depth of the frame 140 may not be sufficient to counteract the insufficient curvature of the display 30 and/or the displacement of the display 30 relative to the wall 32.

Therefore, an additional or alternative approach to masking such gaps may include providing one or more features (e.g., environmentally consistent features) blocking the view of the potential observer. As an example, various window coverings such as drapes, curtains, blinds, shutters, and the like, may be positioned over the opening 26 in a manner that blocks view directions that would reveal the gaps.

Effects other than the gaps depicted in FIGS. 17-19 may also be present. For instance, even if the curvature of the display 30 is sufficient so that the edges 182, 184 are not visible from any view direction in the viewing area 28, certain regions of the display 30 having a steep angle of incidence of the projection cone 122 thereon (e.g., the top portion 114 of FIGS. 11 and 13) may suffer from pixel distortion, as discussed above.

To counteract such distortion, the surface of the display 30, or the surface of a window pane of a transparent or translucent material within the opening 26 may be modified to simulate certain permanent effects that would be expected to result in a distorted view. As one example, the surface of the window 68 (e.g., outer or inner surface of the window pane) and/or the display 30 may be chemically and/or mechanically processed to include surface textures and/or discoloring. The surface texturing may simulate broken glass, a wet surface (e.g., from rain), etching from wear, aging, and the like. The discoloring or other treatment may simulate aging of the window 68 (window pane), resulting in blurring of a region of the image. For instance, if the passenger platform 18 is a train car, the discoloring or other region having surface treatment may be used to blend the display 30 with the other surroundings of the platform 18 (e.g., the seating 102) to give the display 30 an "antiqued" appearance. As one example, a window pane within the opening 26 may include regions of aging from mechanical or chemical treatment, painting, or the like, and these regions may cause certain regions of the image displayed by the display 30 to appear blurry through the window 68. The intentional blurring of the image may be desirable to mask certain undesired distortions of the image, such as low pixel density and/or distorted pixels.

Figure 20:
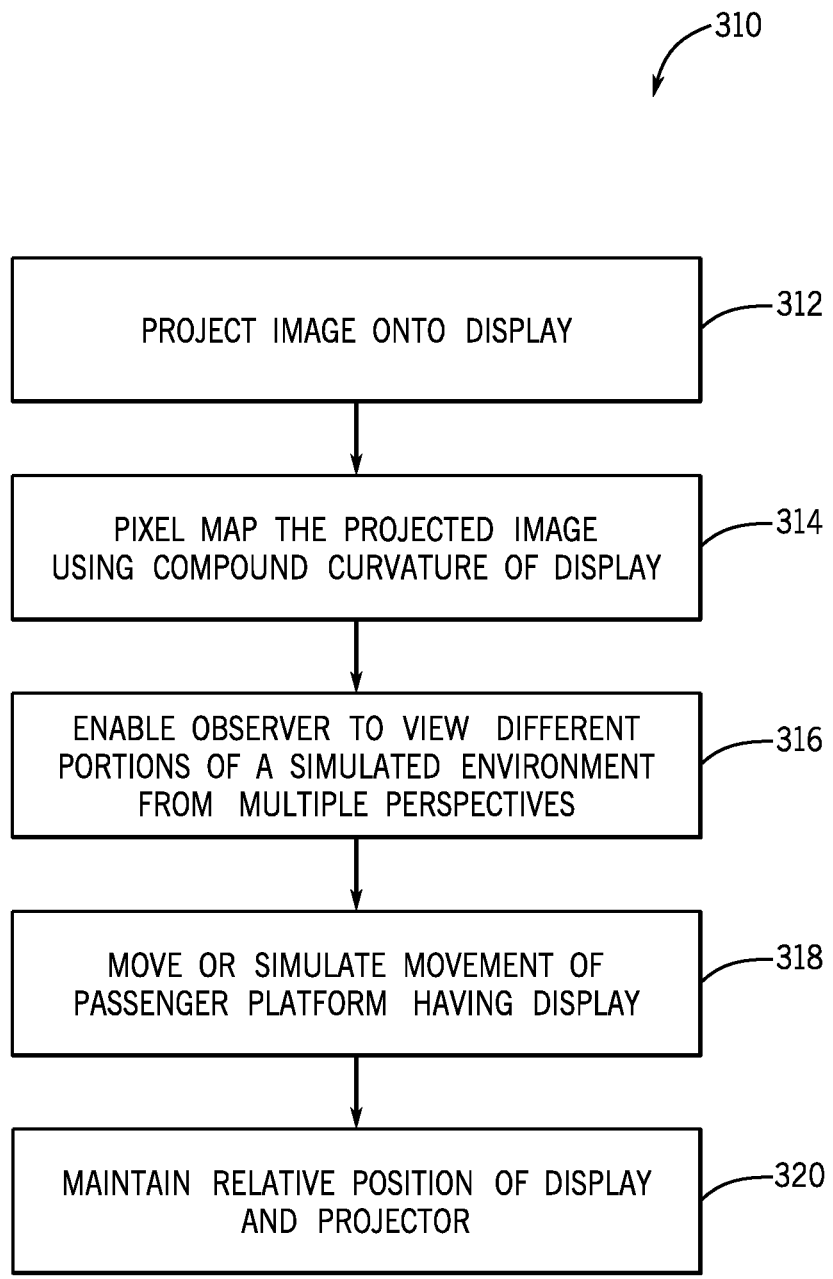
FIG. 20 is a process flow diagram illustrating an embodiment of a method of operation of the display system.

The embodiments of the display system 24 described above are intended to encompass methods in which image-based media (visual media) is displayed at multiple directions to enable multiple vantage points each having unique views of the media. One such method 310 is depicted in FIG. 20 as a block diagram, and is intended to represent a high-level example of the manner in which the systems described above operate when implemented using a projector (e.g., projector 120) and a projection screen operating as the display 30. Indeed, any one or a combination of the acts, methods, steps, devices, configurations, systems, and so on, described above may be used to implement or used in combination with the example method 310 set forth below.

As illustrated, the method 310 includes projecting (block 312) image-based media onto a display (e.g., display 30) with a projector (e.g., projector 120). The projector may, for instance, access data representative of the media from a non-transitory storage device, such as a computing device having memory circuitry, or any other device such as a media player.

The display 30, as noted above, is attached to a first side of a wall (e.g., wall 32) opposite a second side of the wall from which the display is viewable by an observer. For instance, the mounting system 36 (FIG. 1) may secure the display 30 to the wall 32. The display may also be positioned over an opening (e.g., opening 26) in the wall.

The method may further include display mapping (block 314) pixels of the projected image-based media using a compound curvature of a surface of the display, which may include displaying a pre-conditioned image (e.g., an image that has been pre-processed based on a perceived distortion by various curvatures of the display) such that it is presented in a substantially undistorted manner. In the present context, this pixel map may produce a substantially undistorted simulation of an environment (e.g., environment 160 of FIG. 4). For example, the simulated environment may have an appearance of being behind the surface of the display such that the display acts as a window through the wall and into the simulated environment.

In certain embodiments, projecting the image-based media onto the display with the projector in accordance with block 312 may include projecting the image-based media from a projection perspective that is below and behind the display relative to the observer. In such embodiments, the compound curvature of the display causes pixel stretching in accordance with block 314 to a greater extent at an upper portion of the display (e.g., top portion 114) compared to a lower portion of the display (e.g., bottom portion 112). The lower amount of pixel stretching at the lower position relative to the upper position enables the observer to view a portion of the simulated environment appearing to be situated below the observer at a higher resolution compared to a portion situated above the observer.

As an example, the acts of block 314 may include enabling greater pixel resolution of the simulated environment at the lower portion compared to the upper portion using a first and second curvature (e.g., bottom and top curvatures 108, 110, respectively) of the compound curvature. In such embodiments, the first curvature is along the lower portion of the surface and along a plane oriented parallel relative to the lateral edges (e.g., edges 182) of the display, and the second curvature is along the upper portion of the surface and is also along the plane oriented parallel relative to the lateral edges of the display. The greater pixel resolution may be enabled by having a greater degree of curvature for the first curvature relative to the second curvature.

The method 300 may further include enabling (block 316) the observer to view the simulated environment from multiple perspectives, i.e., vantage points or view directions. The different view directions may each provide a different view of the simulated environment produced on the display. As discussed above, such simulations may be enabled by the compound curvature of the surface of the display and the terminated view cones of the display beyond the extent of the opening in the wall through which the display is seen.

As set forth above, the display system of the present disclosure may be incorporated into a ride vehicle or other simulated vehicle. The method 300 also includes, in such embodiments, moving or simulating movement (block 318) of a passenger platform (e.g., passenger platform 18) having the wall to which the display is mounted. For example, the movement or simulated movement may be coordinated with the simulated environment, for example by simulating horizontal and/or vertical movement of the simulated environment in synchrony with motion of the passenger platform.

The method may also include substantially maintaining (block 320) a position of the screen relative to the projector using a mounting assembly (e.g., mounting system 36) that mounts the screen and the projector together to the passenger platform. In keeping the projector and the screen in a mechanically coupled state, vibrations experienced from the movement or simulated movement are substantially the same for the screen and projector. By limiting movement of the projector relative to the display, or vice-versa, the mounting assembly may reduce unwanted pixel movement and "shaking" of the projected image. As set forth above with respect to FIG. 3, the projector may also be mounted using a vibration dampening mechanism, which may use padding (e.g., foam padding), springs, shocks, struts, or any other device or material suitable for vibration dampening.

As discussed above, present embodiments are enabled by a combination of the compound curvature of the display 30, the termination of its viewing cone, and the image presented by the display 30, among other aspects of the display system 24 and the passenger platform 18. When the display 30 includes a projection screen, one or more images projected into a projection surface of the display 30 illuminates the curved surface of the display 30. The display 30 then presents the image or image in a substantially undistorted manner in the different, changing directions by the display 30 (e.g., as shown in FIG. 15). To enable such presentations, as should be appreciated from the foregoing discussion, the image may include several areas/locations having distinct types of distortion (e.g., preconditioning).

For example, referring to the embodiment depicted in FIG. 15, the image may be pre-distorted to include compressed pixels at regions of the image displayed by the bottom portion 112 of the display, the top portion 114, and the lateral portions. Indeed, the degree of compression may be greater for the regions of the display having greater degrees of curvature.

Figure 21:
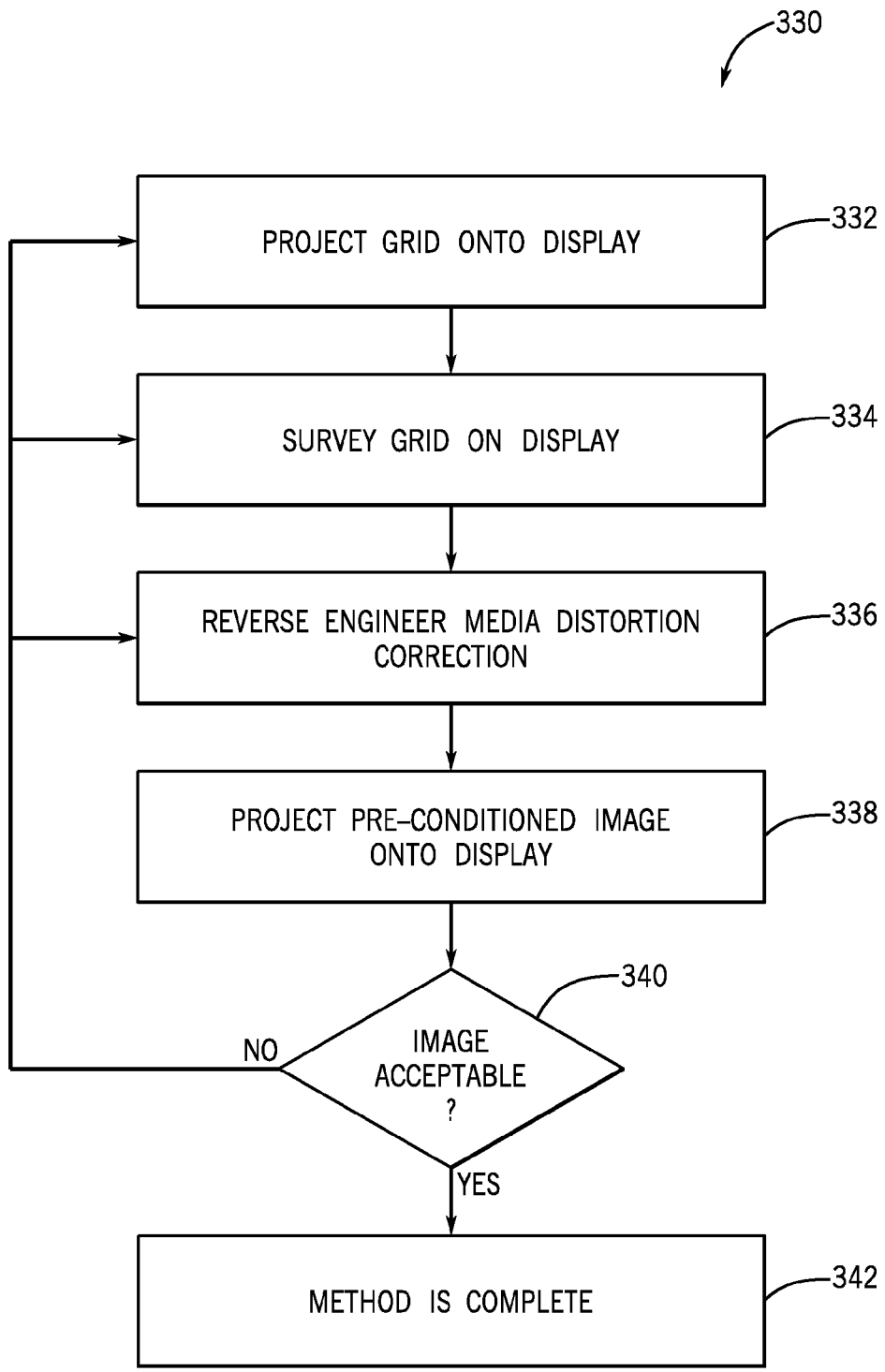
FIG. 21 is a process flow diagram illustrating an embodiment of a method of distorting media to enable substantially undistorted image to be displayed on a surface having a compound curvature.
Figure 22:
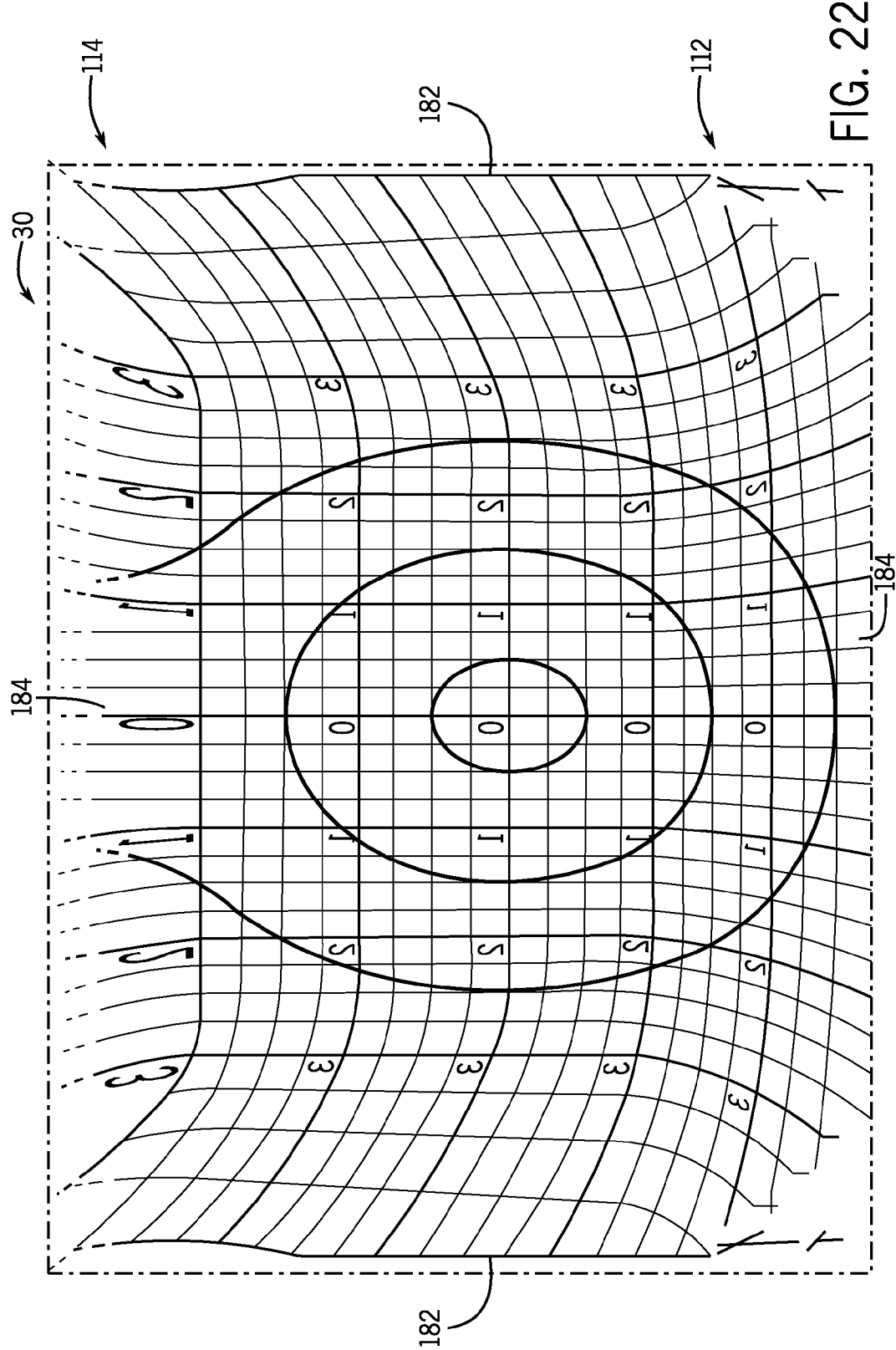
FIG. 22 is a view of a grid projected onto an embodiment of the display to ascertain the pixel distortion caused by the compound curvature of the display.

As an example, a method 330 of pre-conditioning the media is discussed herein with respect to FIGS. 21 and 22. In the embodiment of the method 330, shown in FIG. 21 as a process flow diagram, a known grid (e.g., pixel map 116) is projected (block 332) onto the display (e.g., display 30). An actual example of a grid is shown in FIG. 22, projected onto the display 30.

Subsequent to projecting the grid onto the display 30, the method 330 includes surveying (block 334) the displayed grid. The act of surveying the projected media may include recording the distortion of the grid caused by the compound curvature of the display 30. As shown in FIG. 22, the grid includes numerical column and row identifiers, which demonstrate the manner in which different portions of the projected media will be distorted by the compound curvature of the display 30. Because the projected media is projected from a perspective below the display 30, a bottom row of the grid, occurring at the bottom portion 112 of the display 30, has a greater luminosity than the other rows situated above.

In addition, greater resolution of the numbers and the lines of the grid can be observed at the bottom portion 112 relative to the top portion 114. Indeed, moving in the direction along the display 30 from the bottom portion 112 to the top portion 114, resolution decreases. In addition, the top most row of the grid, occurring at the top portion 114 of the display 30, is stretched to a relatively large extent compared to other portions of the display 30. This is at least due to the steep angle at which the projection cone 122 is incident on the surface of the display 30 in the top portion 114. The recording of the manner in which the image is distorted may be performed by, for example, a system designer or operator, or may be performed automatically using various shape and optical recognition devices and associated computer-based instructions, or a combination thereof. Such recording may then be utilized to reverse engineer (block 336) the pre-conditioning (e.g., distortion correction) applied to the media—thereby resulting in pre-conditioned images.

For instance, the regions of the image toward the lateral edges 182 of the display 30 show warping of the pixels. Accordingly, a portion of the image corresponding to the warped pixels may be pre-distorted by having a larger width in the compressed region of the warped shape, while having a smaller width in the expanded region of the warped shape. The goal, therefore, is to pre-distort the image so that when the media is displayed, it is then distorted by the display 30 to a substantially undistorted state.

The method 330, therefore, may include projecting (block 338) the media onto the display 30, and determining (query 340) whether the displayed media is acceptable. If the displayed media is unacceptable, the method 330 may cycle back to the acts of block 332, 334, or 336, or any combination, and the method 330 may proceed from that point. On the other hand, if it is determined that the displayed media is acceptable, the method 330 may be complete (block 342).

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:
1. A system, comprising:
 a viewing region bounded at least partially by a wall having an opening;
 a display screen mounted on the wall and positioned over the opening, wherein the display screen comprises:
  edges that extend beyond the opening; and
  curvatures that curve the display screen toward and away from the wall in at least two directions and about at least two axes, wherein the edges and the curvatures terminate a viewing cone of the display screen outside of the viewing region, wherein the viewing cone of the display screen represents all view directions from which an image displayed by the display screen can be observed via the opening;

a projector positioned in a projection region separated from the viewing region by the wall, wherein the projector is configured to project the image onto a projection surface of the display screen; and an access panel configured to provide access to the projector from the viewing region through the wall, wherein the projector is positioned on a track configured to move the projector from the projection region, through an opening in the wall vacated by the access panel, and into the viewing region.

2. The system of claim 1, wherein the projection surface is on an opposite side of the display screen compared to a display surface on which the media displayed by the display screen can be observed.

3. The system of claim 1, wherein the projector is an ultra-short throw projector, and the projector comprises a halogen light source, a light emitting diode (LED) light source, a laser light source, a liquid crystal on silicon (LCOS) light source, or any combination thereof.

4. The system of claim 1, wherein the projector is configured to project the image using stereoscopy onto the projection surface of the display screen, wherein the projector is communicatively coupled to control circuitry configured to control the projector, and wherein the control circuitry is configured to cause the projector to project alternating pairs of images to generate a three-dimensional effect for the image when viewed using active three-dimensional glasses.

5. The system of claim 1, wherein the projector is configured to project the image using stereoscopy onto the projection surface of the display screen, wherein the projector is communicatively coupled to control circuitry configured to control the projector, and wherein the control circuitry is configured to cause the projector to project simultaneous pairs of images to generate a three-dimensional effect for the image when viewed using passive three-dimensional glasses.

6. The system of claim 1, wherein the projector and one or more additional projectors are configured to collectively project the image onto the projection surface of the display screen, wherein the projector and the one or more additional projectors are communicatively coupled to control circuitry configured to control the projector and the one or more additional projectors, wherein the control circuitry is configured to cause the projector and the one or more additional projectors to simultaneously project partial images onto the display surface to form the image, and wherein the control circuitry is configured to edge blend the partial images to mask a transition from one partial image to another.

7. A system, comprising:
a viewing region bounded at least partially by a wall having an opening;
a display screen mounted on the wall and positioned over the opening, wherein the display screen comprises:
edges that extend beyond the opening; and
curvatures that curve the display screen toward and away from the wall in at least two directions and about at least two axes, wherein the edges and the curvatures terminate a viewing cone of the display screen outside of the viewing region, wherein the viewing cone of the display screen represents all view directions from which an image displayed by the display screen can be observed via the opening;

a projector positioned in a projection region separated from the viewing region by the wall, wherein the projector is configured to project the image onto a projection surface of the display screen; and a window pane disposed within the opening, wherein the window pane comprises regions of surface modification configured to blur one or more portions of the image displayed by the screen to mask certain undesired distortions of the image.

8. The system of claim 7, wherein the curvatures comprise a first curvature positioned at a bottom portion of the display screen, and the first curvature enables the display screen to simulate a portion of an environment that is situated underneath an observer viewing the display screen.

9. The system of claim 8, wherein the first curvature is along a plane oriented orthogonal relative to the wall and along a height of the display screen, and the first curvature is asymmetric.

10. The system of claim 8, wherein the first curvature is away from the observer.

11. The system of claim 8, wherein the curvatures comprise a second curvature positioned at an upper portion of the display screen, and the second curvature enables the display screen to simulate a portion of an environment that is situated above the observer.

12. The system of claim 11, wherein the second curvature is along a plane oriented orthogonal relative to the wall and along a height of the display screen, and the second curvature is asymmetric.

13. The system of claim 11, wherein a first degree of curvature of the first curvature is greater than a second degree of curvature of the second curvature.

14. The system of claim 11, wherein the curvatures comprise third and fourth curvatures positioned at opposite sides of the display screen, wherein the third and fourth curvatures are configured to simulate portions of an environment situated to the left and right of the observer, respectively.

15. The system of claim 14, wherein the first, second, third, and fourth curvatures are all connected by a substantially flat portion of the display screen.

16. The system of claim 14, wherein the third and fourth curvatures are positioned along a plane oriented orthogonal relative to the wall and along a width of the display screen.

17. The system of claim 7, comprising a non-transitory, machine-readable medium in communication with the projector and storing data representative of the image, wherein the projection surface is opposite from a display surface of the display screen, and the curvatures extend into the projection region.

18. The system of claim 17, wherein the wall is located on a passenger platform that is a part of a transportation system, and the display screen is configured to display a simulated environment that is a simulated moving environment synchronized with movement of the transportation system.

19. The system of claim 17, wherein the image is intentionally pre-conditioned such that when projected onto the display screen, display warping of the image caused by angles of incidence formed between a perspective from which the projector projects the image and the curvatures of the display screen causes a simulated environment to appear substantially undistorted on the display screen.

* * * * *